United States Patent [19]

Pinnau et al.

[11] Patent Number: 5,779,763
[45] Date of Patent: Jul. 14, 1998

[54] PROCESS FOR RECOVERING SEMICONDUCTOR INDUSTRY CLEANING COMPOUNDS

[75] Inventors: Ingo Pinnau, Palo Alto; Johannes G. Wijmans, Menlo Park; Zhenjie He, Daly City; Shannon Goakey, San Jose; Richard W. Baker, Palo Alto, all of Calif.

[73] Assignee: Membrane Technology and Research, Inc., Menlo Park, Calif.

[21] Appl. No.: 813,520

[22] Filed: Mar. 7, 1997

[51] Int. Cl.[6] .................................. B01D 53/22
[52] U.S. Cl. .................. 95/39; 95/45; 95/53; 95/55; 95/47
[58] Field of Search .................. 95/45, 47–55, 95/39

[56] References Cited

U.S. PATENT DOCUMENTS

| | | | |
|---|---|---|---|
| 4,553,983 | 11/1985 | Baker | 55/16 |
| 4,654,063 | 3/1987 | Auvil et al. | 62/18 |
| 4,906,256 | 3/1990 | Baker et al. | 55/16 |
| 4,963,165 | 10/1990 | Blume et al. | 55/16 |
| 4,994,094 | 2/1991 | Behling et al. | 55/16 |
| 5,032,148 | 7/1991 | Baker et al. | 55/16 |
| 5,051,114 | 9/1991 | Nemser et al. | 95/51 X |
| 5,064,447 | 11/1991 | Lee | 95/48 |
| 5,069,686 | 12/1991 | Baker et al. | 95/47 |
| 5,089,033 | 2/1992 | Wijmans | 55/16 |
| 5,196,616 | 3/1993 | Lee et al. | 570/178 |
| 5,205,843 | 4/1993 | Kaschemekat et al. | 55/16 |
| 5,256,295 | 10/1993 | Baker et al. | 95/45 X |
| 5,256,296 | 10/1993 | Baker et al. | 95/45 X |
| 5,281,253 | 1/1994 | Thompson | 95/45 X |
| 5,281,255 | 1/1994 | Toy et al. | 95/50 |
| 5,288,304 | 2/1994 | Koros et al. | 95/45 |
| 5,374,300 | 12/1994 | Kaschemekat et al. | 95/39 |
| 5,501,722 | 3/1996 | Toy et al. | 95/45 X |
| 5,538,536 | 7/1996 | Fuentes et al. | 95/45 |

FOREIGN PATENT DOCUMENTS

| | | |
|---|---|---|
| 0754487 | 1/1997 | European Pat. Off. . |

OTHER PUBLICATIONS

J.Y. Park et al. "Correlation and Prediction of Gas Permeability in Glassy Polymer Membrane Materials via a Modified Free Volume Based Group Contribution Method". J. Memb. Sci., 125, (1997) pp. 23–39.

H. Odani et al., "Membranes of Substituted Polyacetylenes for Gas Separation," *Polymers for Gas Separation*, N. Toshima (Ed.), pp. 125–126, VCH Publishers, NY, 1992.

*Primary Examiner*—Robert Spitzer
*Attorney, Agent, or Firm*—J. Farrant

[57] ABSTRACT

A process for separating perfluoro compound gas or vapor from another gas, typically nitrogen, in a gas mixture. The process involves a combination of membrane separation and condensation, and is particularly useful in the semiconductor industry, for treating exhaust gases from cleaning of chemical vapor deposition chambers. Operation of the condensation step at temperatures no lower than about −30° C. reduces the need for refrigeration equipment and controls the amount of gas dissolved in the recovered perfluoro compound.

71 Claims, 15 Drawing Sheets

PROCESS FOR RECOVERING SEMICONDUCTOR INDUSTRY CLEANING COMPOUNDS

This invention was made in part with Government support under SBIR Contract Number 68D60028, awarded by the Environmental Protection Agency. The Government has certain rights in this invention.

FIELD OF THE INVENTION

The invention concerns separation and recovery of gaseous perfluorinated compounds, such as are used as cleaning agents in the semiconductor industry, from permanent gases and the like.

BACKGROUND OF THE INVENTION

Perfluorinated compounds, including perfluorocarbons, tend to be chemically inert. Their stability, coupled with related properties such as non-flammability, low surface tension and low solubility, have made these compounds useful as refrigerants, solvents, cleaning agents, fire extinguishers, lubricants, hydraulic fluids and insulators.

In the past, perfluoro compounds were manufactured, used and discharged to the environment freely. However, it was recognized some years ago that their inertness, besides making them materials of choice for the uses above, also causes them to break down extremely slowly in the upper atmosphere, giving them global warming potentials much higher than the other so-called greenhouse gases, carbon dioxide and methane.

Over the last four or five years, serious efforts have been made both to develop alternative materials and to control emissions. Despite some success, there remain applications for which no satisfactory replacements have been found. One area that continues to rely on perfluorinated compounds is the electronics industry, particularly the semiconductor industry.

As part of the semiconductor manufacturing process, perfluorocarbons and other perfluoro compounds are used to clean chemical vapor deposition (CVD) chambers. Typically, the perfluoro compound is fed to the CVD chamber, where a plasma is formed. A portion of the perfluoro compound dissociates into highly reactive ionic species, $C_2F_5^+$ for example, which react with deposited material to clean the surface of the chamber. After a cleaning cycle, the gas mixture from the chamber is evacuated and diluted with nitrogen. The dilute gas is passed to a scrubber to remove any remaining ionic species, and the exhaust gas from the scrubber, typically containing a few percent perfluoro compound, is vented to the atmosphere.

Options for treating this exhaust gas include incineration and cryogenic condensation. Incineration is costly, and produces an acid-containing effluent that must itself be treated. Condensation is more attractive, in that the perfluoro compounds are recovered rather than destroyed, and may be reclaimed for further use. However, the low boiling points of some of the commonly used perfluoro compounds mean that cryogenic temperatures, as low as $-120°$ C. or $-140°$ C., for example, must be used to recover reasonable amounts of perfluoro compound.

Thus, there remains a need for a simple, cost-effective treatment that can recover perfluoro compounds under comparatively mild temperature conditions, and preferably without generating secondary wastes.

Separation of certain gas mixtures by means of selective membranes has been known to be possible for many years, and membrane-based gas separation systems are emerging to challenge conventional separations technology in a number of areas.

That membranes have the potential to separate organic vapors from other gases is also known. For example, U.S. Pat. Nos. 4,553,983; 4,963,165; 4,906,256; 4,994,094; 5,032,148 and 5,281,255 all describe membranes, systems or processes suitable for such separations. Membranes that use a rubbery polymer as the discriminating material are usually selective for organic compounds over other gases, as well as offering comparatively high transmembrane flux. For these reasons, explained in more detail below, rubbery membranes are the membranes of choice for many organic vapor or organic gas separations, and commercial processes for separating volatile organic compounds use rubbery membranes.

It has also been recognized that condensation and membrane separation may be combined, as is shown in some of the patents listed above, and more specifically in U.S. Pat. Nos. 5,089,033; 5,199,962; 5,205,843 and 5,374,300. These patents describe processes for separating condensable components, including organic components, from gas mixtures, and disclose a variety of process configurations with a condensation step preceding or following a membrane separation step.

We are aware of no publications reporting permeation properties of glassy polymer materials with respect to perfluoro compounds or separation of perfluoro compounds from other gases. Neither are we aware of any publications describing processes that include such a separation.

SUMMARY OF THE INVENTION

The invention is a process for separating perfluoro compound gas or vapor from another gas, typically air or nitrogen, in a gas mixture. The process involves a combination of membrane separation and condensation.

In its first aspect, the process of the invention uses two membrane separation steps, with the residue or reject stream from the first step forming the feed to the second step. The membranes are chosen to be selective for the other gas over the perfluoro compound gas, so that the residue streams are progressively enriched in perfluoro compound. The residue from the second step is then subjected to condensation to liquefy at least a portion of the perfluoro compound. The distinguishing process attributes include the ability to carry out the condensation step under moderate temperature conditions, no lower than about $-30°$ C., even for perfluoro compounds with low boiling points, such as $-80°$ C. or lower. The ability to condense under comparatively mild conditions makes for cost and energy efficiency.

The process can be configured to produce only two streams, a perfluoro compound stream and a stream of the gas from which the perfluoro compound has been separated. The processes of the invention can achieve simultaneously high purity for both streams, such as 90%, 95% purity, or better.

In its second aspect, the process of the invention again uses a membrane separation step in which the membrane is chosen to be selective for the other gas over the perfluoro compound gas. In this case, however, the residue from this step is subjected to a condensation step, to liquefy at least a portion of the perfluoro compound. Uncondensed gas from the condenser is then passed to a second membrane separation step. The perfluoro compound-enriched stream from this step is recirculated to the condensation step, and the perfluoro compound-depleted stream is recirculated for treatment in the first membrane unit.

In both aspects of the invention, the driving force for transmembrane permeation is provided by a pressure difference between the feed and permeate sides of the membrane. It is generally desirable, although not necessary, to operate with a higher than atmospheric pressure on the feed side of the membranes; this elevated pressure also facilitates the condensation step. If the raw gas is not already at high pressure, it is preferred, therefore, to compress the feed gas stream before passing it to the first membrane separation step, such as to no greater than about 500 psia, or no greater than about 200 psia, for example.

The process in both aspects can include additional treatment upstream of the first membrane unit. For example, if the stream to be treated contains a very low concentration of perfluoro compound, such as less than about 1%, it may be desirable to add an additional membrane step to raise the perfluoro compound concentration before the stream enters the main membrane units. Similarly, additional membrane steps may be added downstream, such as to adjust the composition of streams for recirculation in the process, or otherwise. Non-membrane treatments may also be included in the process on the upstream and downstream sides. Such treatments can be physical or chemical and include, but are not limited to, absorption, adsorption, stripping and distillation.

In the first aspect of the invention, it is optional, but preferred, to recirculate any gas not condensed in the condensation step to the feed side of the second membrane unit, either directly or after additional treatment.

A particular advantage of the invention is that, in some circumstances, the process may be configured so that no off-gas remains after the condensation step.

In the first aspect of the invention, it is also advantageous in some cases to compress the gas passing through the process to a higher pressure as part of, or immediately prior to, the condensation step.

The processes of the invention may be carried out with like or unlike membranes in both membrane steps. For example, one membrane step may offer very high flux but more modest COD selectivity, and the other high selectivity but more modest flux. Preferably, the process uses membranes that, although rigid and glassy under the conditions of use, contain a high free volume within the polymer materials. Such membranes can exhibit a high transmembrane pressure-normalized flux, such as about $1\times10^{-5}$ cm$^3$ (STP)/cm$^2$·s·cmHg or more, under the process conditions, and provide opportunities for controlling membrane area and transmembrane driving force requirements.

It is also possible to use a perfluoro compound-rejecting membrane in one step and a perfluoro compound-selective membrane in the other.

The process can be used to treat any gas stream that contains a perfluoro compound and another gas. The perfluoro compound may be the minor or major component of the stream.

The process is particularly useful in the semiconductor industry, for treating exhaust gases from cleaning operations, such as mixtures of dilute concentrations of perfluoroethane in nitrogen, for example. In this application, the process of the invention can be configured to produce a liquefied perfluoro compound stream containing only small amounts of dissolved nitrogen. Operation of the condensation step at comparatively warm temperatures and modest pressures enables the amount of dissolved gas to be controlled. This is an advantage, because it provides a method for limiting degassing of the liquid during transport or storage. At the same time, the process produces a nitrogen stream that is essentially perfluorocarbon-free, which can be vented without compromising environmental quality.

The process arrangements disclosed herein are also expected to be useful for treating other gas mixtures containing an organic component, often as a minor component, for example in the case where no membranes are readily available that offer sufficient selectivity for the organic component over the other component. Examples include mixtures of brominated hydrocarbons in nitrogen, propane and hydrogen, and methane and heavier hydrocarbons. The process is also useful for separating certain inorganic gas mixtures, such as ammonia/hydrogen mixtures.

It is to be understood that the above summary and the following detailed description are intended to explain and illustrate the invention without restricting its scope.

DETAILED DESCRIPTION OF THE INVENTION

The term gas as used herein means gas or vapor.

The term perfluoro compound as used herein means a compound having the formula $X_mF_n$, where X represents an atom of an element capable of forming a compound with fluorine, F represents a fluorine atom and m and n are positive integers.

The term perfluorocarbon as used herein means a perfluoro compound of the formula $C_mF_n$, where C represents a carbon atom. The terms perfluoro compound and perfluorocarbon are also used herein to include compounds of the formula $C_xF_yH_z$, where C, F and H represent carbon, fluorine and hydrogen atoms, where x, y and z are positive integers, insofar as these compounds, although not strictly perfluorinated, have properties and uses similar to their perfluorinated counterparts.

Percentages used herein are by volume unless otherwise stated.

The scope of the invention is not intended to be limited to any particular streams, but to cover any situation where a stream containing a perfluoro compound and another gas is to be separated. The composition of the stream may vary widely, from a mixture that contains the perfluoro compound in the ppm range or below, to streams that contain the perfluoro compound as the major component.

The invention is expected to be particularly useful in separating streams containing mixtures of low concentrations of perfluorocarbons, such as 10%, 5%, 3% or less in nitrogen, air, hydrogen, argon or helium. Other possible applications include separation of perfluoro compounds from hydrogen, helium or argon.

At the moment, we believe that the invention will be most useful for separating perfluoro compounds from nitrogen, and, for simplicity and clarity, but not by way of limitation, the detailed description that follows focuses on the invention in this regard.

Representative perfluoro compounds that may be separated from other gases by the processes of the invention include, but are not limited to, perfluoromethane ($CF_4$), perfluoroethane ($C_2F_6$), perfluoropropane ($C_3F_8$), perfluoroethylene ($C_2F_4$), perfluoropropylene ($C_3F_6$), octafluorocyclobutane ($C_4F_8$), methyl fluoride ($CHF_3$), difluoroethylene ($C_2H_2F_2$), difluoroethane ($C_2H_4F_2$), nitrogen trifluoride ($NF_3$), chlorine trifluoride ($ClF_3$), bromine trifluoride ($BrF_3$), iodine trifluoride ($IF_3$), boron trifluoride ($BF_3$), silicon fluoride ($SiF_4$), sulfur hexafluoride ($SF_6$), and tungsten fluoride ($WF_6$).

Figure 1:
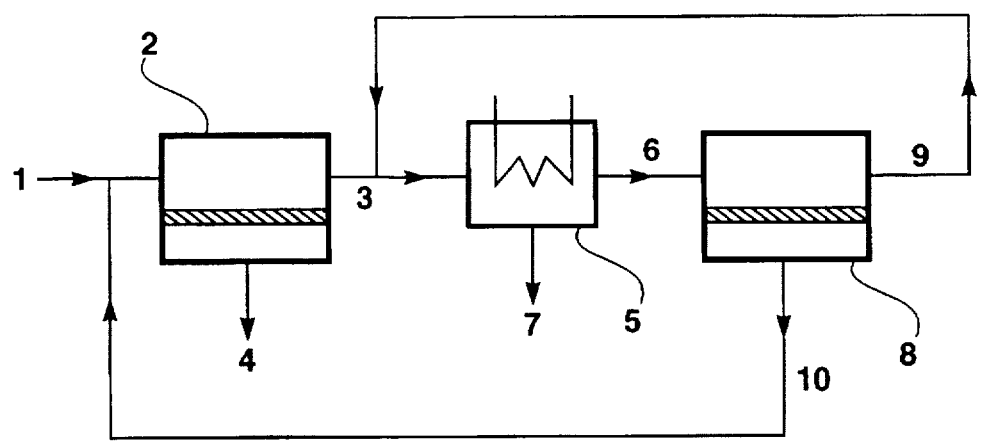
FIG. 1 is a schematic representation of a basic embodiment of the invention in which a condensation step is carried out between two membrane separation steps.
Figure 2:
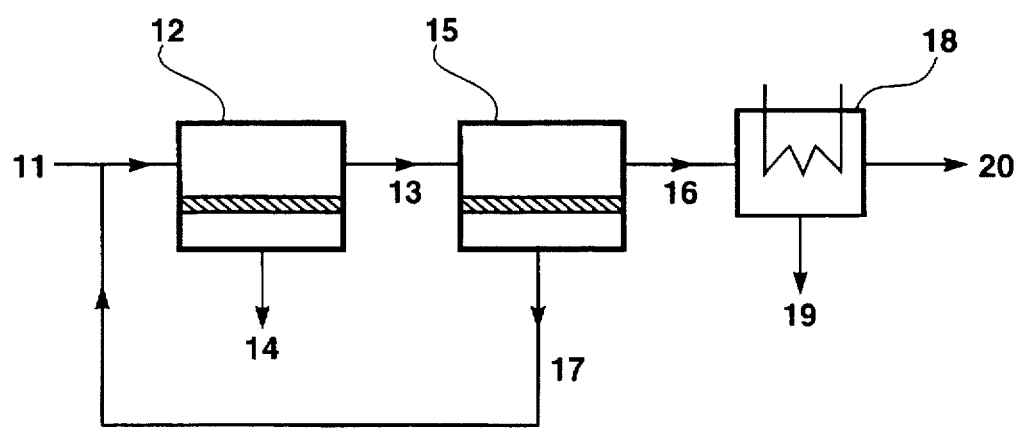
FIG. 2 is a schematic representation of a basic embodiment of the invention in which a condensation step is carried out after two membrane separation steps.

There are two alternative embodiments of the invention in basic form, the flow diagrams for which are shown in FIGS. 1 and 2. Both embodiments use two membrane separation steps and a condensation step. In one embodiment, the condensation step is carried out between the membrane separation steps; in the other, it is carried out on the concentrated perfluoro compound stream from the second membrane step.

Turning first to FIG. 1, this shows the arrangement in which the condensation step is carried out between the two membrane separation steps. The feed stream, 1, containing a perfluoro compound and, for example, nitrogen, enters the first membrane unit, 2, which may contain a single membrane module or an array of modules, depending on the membrane area required.

A synthetic polymer membrane separates the components of a gas or vapor mixture because the components permeate the membrane at different rates. The permeability, P |$cm^3$(STP)·cm/$cm^3$·s·cmHg|, of a polymer membrane material for a gas is defined as the rate at which that gas moves through a standard thickness |1 cm| of the material under a standard driving force |a pressure difference of 1 cmHg|. A measure of the ability of a membrane to separate two gases is the selectivity, a, defined as the ratio of the gas permeabilities, $P_1/P_2$.

The intrinsic selectivity of a polymer material is established by measuring the permeabilities with pure gas or vapor samples, then calculating the ratio. The actual selectivity obtained in a real separation process is established by making permeation measurements with gas mixtures.

Selectivity can also be expressed as:

$$\alpha = \frac{D_1}{D_2} \cdot \frac{k_1}{k_2}$$

where D is the diffusion coefficient of the gas in the membrane |$cm^2$/s|, which is a measure of the gas mobility, and k is the Henry's law sorption coefficient, which links the concentration of the gas in the membrane material to the pressure in the adjacent gas |$cm^3$(STP)/$cm^3$·cmHg|, and is a measure of the gas solubility in the membrane material.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law coefficients of the two gases and can be viewed as the solubility selectivity, reflecting the relative condensabilities of the two gases.

In all polymer materials, the diffusion coefficient decreases with increasing molecular size. Hence, the diffusion component of the selectivity always favors the passage of small molecules over large ones. The commonly used perfluoro compounds, such as perfluoroethane, have relatively large molecular diameters compared with nitrogen. For example, the molecular diameter of perfluoromethane is 4.36 Å, of perfluoroethane is 5.13 Å, and of perfluoropropane is 5.69 Å, compared with the nitrogen molecular diameter of 3.74 Å. The diffusion coefficient thus favors permeation of nitrogen over perfluoro compounds.

The solubility component of the selectivity, on the other hand, is a measure of the energy required for sorption and normally increases with molecular diameter, because larger molecules are normally more condensable than smaller ones. The solubility coefficient favors permeation of perfluoro compound over nitrogen, therefore. The relative contribution of the diffusion and solubility coefficients determines the overall selectivity of a membrane material.

The balance between diffusion selectivity and solubility selectivity is different for glassy and rubbery polymers. In rubbery polymers, the solubility term is usually the dominant term, so that rubbery membranes are selective for larger, more condensable molecules over smaller, less condensable molecules. Furthermore, since the polymer chains in rubbery membranes are more flexible than in glassy membranes, the fluxes of all permeants, whether the more or less favored permeant, are generally higher through rubbery membranes than through glassy membranes.

In the separation of volatile organic compounds from air or other gas, particularly as applied to waste or vent streams, the volatile organic compound is often present in minor amounts, such as only a few percent, or less. Consequently, the use of a rubbery membrane not only provides good selectivity and higher flux than would usually be possible with a glassy membrane, but also saves in membrane area requirement, since the component that is to be permeated is only present in small amounts. If the permeate gas has to be repressurized, which is often the case, permeating the minor component also keeps recompression costs under control. These combined compelling advantages have made rubbery membranes the membranes of choice for many organic vapor or organic gas separations. For these reasons, commercial processes for separating volatile organic compounds use rubbery membranes.

In light of the brief explanation above, it would be expected that rubbery membranes would exhibit selectivity in favor of the perfluoro compound over nitrogen, and that, especially if the perfluoro compound is the minor component of the stream to be treated, a rubbery membrane would be used.

However, many perfluoro compounds are very inert, and have low boiling points. Thus, they sorb into polymers much less easily than do many common volatile organic compounds, and we have found that the selectivity of typical rubbery membrane materials, such as silicone rubber, for perfluoro compounds over other gases is disappointingly low. For example, we found that silicone rubber is about as permeable to nitrogen as to perfluoroethane, and that silicone rubber is in fact slightly selectively permeable to nitrogen over perfluoropropane.

We began, therefore, to investigate the possibility of using glassy polymers to separate perfluoro compounds from other gases. In glassy polymers, the diffusion selectivity term is usually dominant over the solubility term, so permeability falls with increasing permeant size and the material is selective for small molecules over large ones. Thus, it is expected that a glassy membrane material will be selective for nitrogen over perfluoro compounds, although we are aware of no published experimental data to that effect prior to our own work.

Large numbers of glassy polymers that can be formed into membranes are known, including, but not limited to, polysulfones, including polyethersulfones, polyimides, including polyetherimides, polyamides, polycarbonates, including polyestercarbonates, cellulose derivatives, such as cellulose diacetate, cellulose triacetate, cellulose nitrate and ethylcellulose, polyvinyl chloride, polyvinylidene fluoride, polyacrylates, polyphenylene oxide, polymethylpentene, polyacetylenes and substituted polyacetylenes. Any of these representative materials, or other glassy materials, could be used for the membranes of unit 2, subject to preliminary screening experiments to determine the flux and selectivity with the gas compositions and operating conditions likely to be encountered in the process. For example, we found that ethylcellulose exhibits a selectivity for nitrogen over perfluoroethane of about 15, as measured with mixtures of 2% perfluoroethane in nitrogen. For the same mixture, we found that polyphenylene oxide exhibits a nitrogen/perfluoroethane selectivity of about 10.

As a guide to membrane material selection, it is preferred that the membranes provide a selectivity, when in use in the process, for the preferentially permeating component over the perfluoro component of at least about 10, more preferably at least about 20, and most preferably at least about 30, 40, 50 or above.

Since glassy membrane materials are typically relatively impermeable compared with rubbery materials, the fluxes of even thin membranes are low compared with rubbery membranes, and relatively large membrane areas may be needed for the membrane separation step. It is preferred therefore, although not required, to use membrane materials that provide good selectivity in conjunction with a transmembrane pressure-normalized flux for the preferentially permeating gas, when in use in the process, of at least about $5 \times 10^{-6}$ cm$^3$(STP)/cm$^2$·s·cmHg, more preferably at least about $1 \times 10^{-5}$ cm$^3$(STP)/cm$^2$·s·cmHg and most preferably at least about $1 \times 10^{-4}$ cm$^3$(STP)/cm$^2$·s·cmHg. Expressed in terms of polymer permeability, we prefer polymers that exhibit a permeability for the preferentially permeating gas of at least about 1 Barrer, and more preferably at least about 3 Barrer or higher.

One technique for identifying polymers that have the potential for high permeability is to estimate the free volume of the polymer, such as by the group contribution method, which, based on the density of the material, estimates the volume occupied by the molecular fragments that make up the polymer and assumes the remainder of the total volume is free volume. Such a method is taught, for example, in a recent article entitled "Correlation and prediction of gas permeability in glassy polymer membrane materials via a modified free volume based group contribution method", by J. Y. Park and D. R. Paul in *Journal of Membrane Science*, Vol. 125, pages 23–39 (1997), incorporated herein by reference. As a guideline, polymers that have a high fractional free volume are more likely to exhibit a high permeability than denser materials. On this basis, our preferred polymers tend to have a fractional free volume of at least about 0.16.

A preferred class of polymers for use in the invention that has been studied extensively in recent years, and that exhibits unusually high free volume within the polymer, is the substituted acetylenes, having the general structural formula

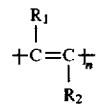

where $R_1$ and $R_2$ are independently hydrogen, a halogen, a phenyl group, or a linear or branched $C_1$–$C_4$ alkyl group. The substituent groups may also include silyl groups, as well as groups containing germanium, sulfur and the like. Substituted acetylenes generally have fractional free volumes above 0.2 as calculated by the above-described method.

The use of substituted acetylene polymers to separate condensable components preferentially from lower-boiling, less condensable components is described in U.S. Pat. No. 5,281,255, for example. In that context, the materials are known as super-glassy materials, and exhibit anomalous behavior for a glassy polymer, in that they are selective for larger, more condensable molecules, including organic molecules, over smaller, less condensable molecules. We started out to evaluate these materials for perfluorocompound-selective membranes, but found to our surprise that, between a perfluoro compound and a permanent gas, the materials in fact reject the perfluoro compound in favor of the other gas. The high free volume gives rise to very high transmembrane pressure-normalized flux for the preferentially permeating gas, sometimes as high as $1 \times 10^{-4}$ cm$^3$ (STP)/cm$^2$·s·cmHg or above. Furthermore, these materials exhibit good gas/perfluoro compound selectivity, even as high as 50, 100 or above in favorable cases.

In selecting substituted polyacetylene materials for use in the invention, reference may be made, for example, to Chapter 4, Sections 3 and 4 of "Polymers for Gas Separation" Naoki Toshima, Ed., VCH Publishers, Inc., New York, N.Y., 1992). In particular Tables 4.3 and 4.4, which are incorporated herein by reference, list the permeability of numerous polymers to a variety of gases.

Our most preferred membranes for use in the process of the invention are made from polymers having repeating units of a hydrocarbon-based, disubstituted polyacetylene, having the general formula:

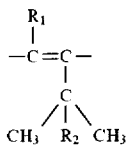

wherein $R_1$ is chosen from the group consisting of $C_1$–$C_4$ alkyl and phenyl, and wherein $R_2$ is chosen independently from the group consisting of hydrogen and phenyl.

In the most preferred embodiment, the membrane comprises poly(4-methyl-2-pentyne) |PMP|, which has repeating units of the structure:

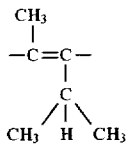

Membranes made from this last group of polymers are disclosed in co-owned and copending patent application Ser. No. 08/663,906 of Jun. 14, 1996 now U.S. Pat. No. 5,707, 423. In that application, the membranes and their uses in organic-selective separations are described.

Other preferred high-free-volume polymers are polymers and copolymers of perfluoro-2,2-dimethyl-1,3-dioxole, available commercially as Teflon AF.

The membrane may take the form of a homogeneous film, an integral asymmetric membrane, a multilayer composite membrane, a membrane incorporating a gel or liquid layer or particulates, or any other form known in the art.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

Figure 3:
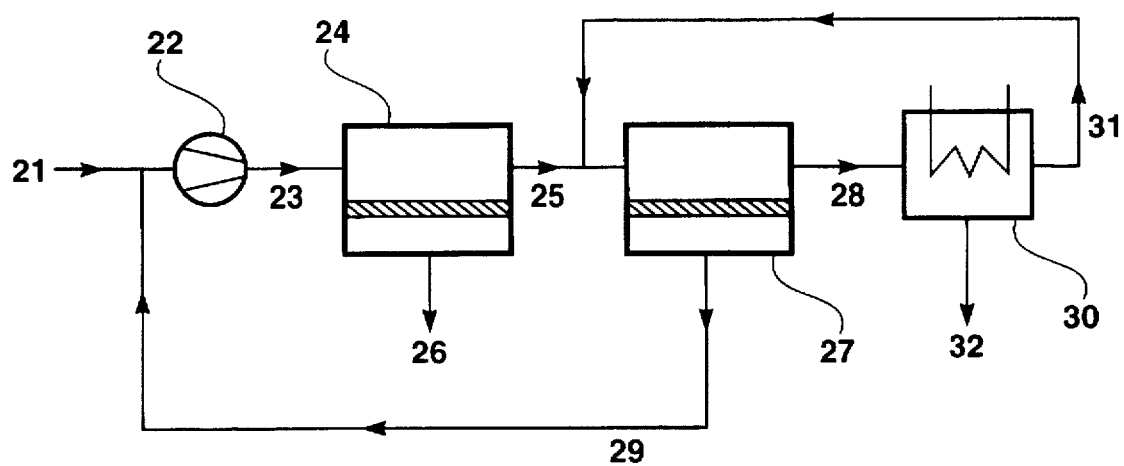
FIG. 3 is a schematic representation of an embodiment of the invention that includes compression of the feed stream, and in which all non-product streams are recirculated.
Figure 7:
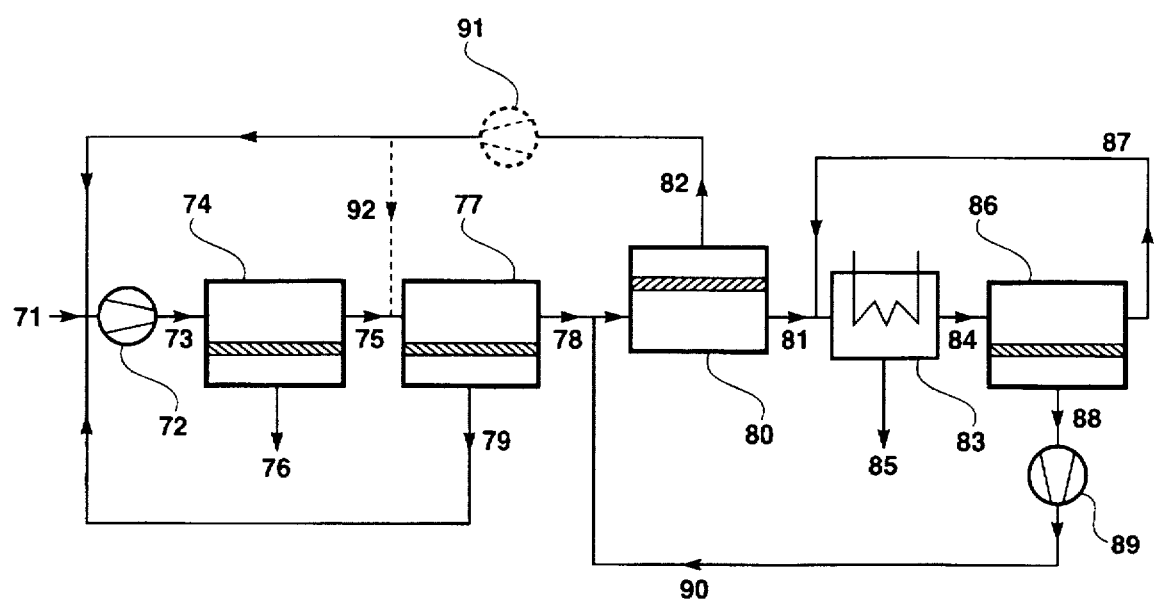
FIG. 7 is a schematic representation of an embodiment of the invention that employs a two-step concentration operation and a two-step recovery operation.

Returning to FIG. 1, feed stream 1 flows through the membrane unit in contact with the feed side of the membranes. A pressure difference between the feed and permeate sides of the membrane is used to provide a driving force for transmembrane permeation. This can be provided in a variety of ways. If the feed stream is already at elevated pressure, for example 50 psia, 100 psia, 200 psia, 300 psia, 500 psia or higher, the permeate side of the membrane may be maintained at atmospheric pressure and no additional driving force need be provided. If the feed stream is at atmospheric pressure or below, or at only modestly elevated pressure, or the pressure is deemed to be insufficient to provide good separation performance for any reason, the feed stream may be passed through a compressor to raise the pressure to any desired value. Such an arrangement is indicated in FIG. 3, for example, by compressor 22. Alternatively, or in addition, the pressure may be reduced on the permeate side by using a vacuum pump or the inlet side of a compressor to draw a partial vacuum on that side. Such an arrangement is indicated in FIG. 7, for example, by compressor 89.

The membrane unit separates the feed stream into permeate stream 4 and residue stream 3. The permeate stream is the product stream of nitrogen, air, or other gas. Since this stream is often discharged to the atmosphere, it is important that the perfluoro compound content be reduced to a low level. As a guideline, it is desirable that the perfluoro compound content of this stream be reduced by at least about 80%, and preferably more, such as at least about 90%, 95%, 98% or 99%, compared with the feed stream. Or, in absolute terms, it is preferred that this stream contain no more than about 1% perfluoro compound, more preferably no more than about 0.5%, and most preferably no more than about 0.1%.

Obtaining a low level of perfluoro compound in the permeate stream is a more difficult challenge than if the discharge stream is the residue stream, as would be the case with perfluoro-compound-selective membranes. A very high degree of removal in the residue stream can be obtained by simply increasing membrane area, so that more of the contaminant can permeate the membrane, leaving a cleaner stream on the feed side. If the permeate stream is the discharge stream, however, care must be taken to prevent permeation of undesirable amounts of the perfluoro compound. This can be achieved, in addition of course to using a membrane of reasonably high selectivity, by adopting a comparatively rapid feed flow rate and/or limiting the membrane area available for permeation. However, such measures will also tend to limit the permeation of the preferred component, so that the residue stream, 3, still contains a relatively large amount of this component. If the residue stream is so dilute that condensation of the perfluoro compound is difficult, the arrangement of FIG. 2 or other modified arrangements may be used, as discussed in more detail below.

Residue stream 3 passes into condensation step 5. For simplicity, this step is identified by a single box from which the condensate liquid, 7, and any remaining uncondensed gas, 6, are shown emerging as discrete streams. It will be appreciated that, in practice, the condensation step will often be carried out by first passing the residue stream into a chiller, which produces a gas/liquid mixture, then a phase separator, in which the phases are separated and from which they are withdrawn as discrete streams. The same comment applies to all other condensers shown in the figures herein.

The temperature at which the condensation step is carried out is important. Some perfluoro compounds have low boiling points at atmospheric pressure. For example, the boiling point of perfluoroethane at 1 atm is –78° C., and of nitrogen trifluoride is –129° C. Thus, it is possible in principle, even if too complicated and expensive in practice, to recover these materials simply by condensation at very low temperatures, such as –60° C. or below. For example, we calculated that to achieve even 70% recovery of perfluoroethane from a 1–3% mixture in nitrogen requires a condensation temperature of –120° C. at 600 psia.

An advantageous aspect of our invention is that recovery of typically 90%, and in some case 95%, or better, of the perfluoro compound can be obtained using condensation temperatures much higher than were previously possible, and that this can be achieved in conjunction with production of a high quality clean discharge stream of the other gas.

It is preferred to carry out the condensation step at a temperature that is no lower than about –30° C. A temperature down to about the bottom of this range should be possible to reach by single-stage refrigeration, for example using propane as the cooling refrigerant. This makes for much simpler and cheaper equipment and operating costs than would be necessary if a refrigeration cascade were required.

Yet more preferably, the condensation step can, in favorable cases, be operated at temperatures as high as no lower than about 0° C., or even higher, such as no lower than about 15° C., even for the low-boiling compounds such as perfluoroethane.

If the feed was originally at high pressure, or was compressed at the start of the process, the residue will remain at very close to this pressure, subject only to some slight drop of pressure along the membrane modules, and the high pressure of the gas entering the condensation step will facilitate liquefaction of the perfluoro compound. Clearly, there will be some trade off between compression requirements and chilling requirements and the optimum value for the pressure and temperature of the condensation conditions will vary on a case-by-case basis. If it is desired to boost the pressure of stream 3 prior to, or as part of, the condensation step, this may be accomplished by positioning a compressor between the membrane unit and chiller, as shown for example in FIG. 4, which is discussed in more detail below. In general condensation pressures no higher than about 500 psia in conjunction with temperatures no lower than about $-30°$ C. are preferred.

The condensed perfluoro compound liquid is withdrawn from the condensation step as stream 7. Stream 7 can be sent to any destination. One advantage of the processes of the invention is that they present an opportunity for perfluoro compound recovery. Thus, this stream may often be sent off-site for processing and reclamation of the perfluoro compound.

In addition to the perfluoro compound itself, stream 7 will usually contain small dissolved amounts of other gas or gases from the stream. For example, feed mixtures of perfluoroethane and nitrogen yield liquid perfluoroethane containing dissolved nitrogen. The colder the temperature of the liquid, the greater the amounts of gas that can be dissolved. Thus, a relatively high condensation temperature will yield a higher purity liquid than a relatively low condensation temperature at the same pressure. This is another advantage of our invention.

Whether the recovered perfluoro compound liquid is sent for reprocessing, stored, or transported to some other destination, it is highly likely that it will not be maintained at low temperature indefinitely. As soon as it encounters a higher temperature, nitrogen degassing will start to occur, and this can give rise to various problems. The ability to achieve a very high level of recovery at a high temperature makes the processes of the invention particularly useful in any situation where subsequent release of dissolved nitrogen is a nuisance.

In general, it is preferred to keep the condensation pressure below about 500 psia.

The gas phase remaining after condensation is withdrawn as stream 6, and is passed to the second membrane step or unit, 8. Like the first step membrane unit, this unit may contain a single membrane module or an array of modules, depending on the membrane area required. The second membrane unit adjusts the compositions of streams 9 and 10 to raise the concentration of perfluoro compound in stream 9 above the saturation concentration for return to the condensation step, and to lower the concentration of the perfluoro component in stream 10 for return to the inlet of the first membrane separation step.

The flow scheme of FIG. 1 shows this second membrane step as containing membranes selective for nitrogen, air or other gas over the perfluoro compound. These membranes may be made from the same polymer material as for the first membrane step.

Typically, however, the second membrane step will be operating under significantly different conditions from the first step. Unless the off gas from the condensation step is heated prior to entry into the second membrane unit, this gas may be at a temperature as low as $-30°$ C. We have found that the selectivity of the preferred glassy membrane materials falls as the temperature falls. Thus, a poorer selectivity is likely to be achieved from the same membrane material in this step of the process. Optionally, this can be corrected if necessary by selecting a membrane material that maintains higher selectivity at low temperature. As another option, stream 6 can be heated, by heat exchange with other stream or directly, to maintain adequate selectivity.

As another alternative, it may be possible for some applications of the process to use a perfluoro-compound-selective membrane for the second step. As was pointed out above, we found that silicone rubber is about as permeable to nitrogen as to perfluoroethane. However, such screening permeation experiments are usually done at room temperature. Thus, at least some rubbery materials that are essentially useless for the present separation purposes at 20° C. can exhibit selectivity in favor of perfluoro compounds at low temperature, so long as they remain comfortably above, such as at least about 20°–40° C. above, their glass transition temperature at the temperature of operation. Rubbers that are suitable for operation at $-30°$ C. include, but are not limited to, silicone rubber and polybutadiene.

This option also provides an opportunity for higher transmembrane flux in the second membrane separation step. Not only do rubbery membranes tend to exhibit higher fluxes than glassy membranes at all temperatures, but the flux of the more condensable preferentially permeating component typically increases with decreasing temperature, whereas in glassy membranes flux tends to decrease with decreasing temperature. Thus, operation by using rubbery perfluoro-compound-selective membranes at lower temperature may, in the right circumstances, bring the joint benefits of improved flux and better separation of the preferred permeant.

As yet another alternative, a perfluoro-compound-selective membrane may be provided by using a super-glassy polymer that is selective in favor of the perfluoro compound under the operating conditions of the second membrane separation step. More details of operation of these membranes as condensable-component-selective membranes may be found in U.S. Pat. No. 5,281,255, which is incorporated herein by reference in its entirety.

As with the membranes of the first separation step, the membranes used in this step may take any convenient form and be housed in any convenient manner.

As was mentioned above, the embodiment of FIG. 1 may include additional membrane or non-membrane treatment upstream or downstream. A few representative examples of such arrangements are discussed below.

The other figures will now be discussed. Where not specifically commented on below, the considerations as to types of membranes, operating conditions of pressure and temperature, target performance and product and recycle stream contents are the same for the other embodiments as for the embodiment of FIG. 1, and, insofar as they give rise to recommended preferred or limiting conditions, those same recommendations and limitations apply to the other embodiments.

Turning to FIG. 2, this shows the other embodiment of the invention in basic form. In this embodiment, the condensation step is carried out on the concentrated perfluoro compound stream from the second membrane separation step. Thus, this embodiment is particularly suited to feed streams in which the perfluoro compound concentration is low initially, such as 5%, 3% or less, and which have the greater need, therefore, of two concentration steps prior to condensation. This embodiment is preferred over the embodiment of FIG. 1 for handling gases from cleaning operations in chemical vapor deposition chambers.

In this case, feed stream 11, containing a perfluoro compound content typically far below saturation concentration under the condensation conditions, enters the first membrane separation step or unit, 12, which may contain a single membrane module or an array of modules, depending on the membrane area required.

As with the first embodiment, it is preferred that the membranes used in step 12 provide a selectivity, when in use in the process, for the preferentially permeating component of at least about 10, more preferably at least about 20, and most preferably at least about 30, 40, 50 or above, most preferably in conjunction with a transmembrane pressure-normalized flux for the non-perfluoro compound gas of at least about $5 \times 10^{-4}$ cm$^3$(STP)/cm$^2 \cdot$s$\cdot$cmHg, $1 \times 10^{-5}$ cm$^3$(STP)/cm$^2 \cdot$s$\cdot$cmHg or $1 \times 10^{-4}$ cm$^3$(STP)/cm$^2 \cdot$s$\cdot$cmHg.

As with the embodiment of FIG. 1, the preferred membranes are glassy membranes having a high free volume within the polymer structure, leading to high flux.

The most preferred membranes are made from polymers having repeating units of a hydrocarbon-based, disubstituted polyacetylene, having the general formula:

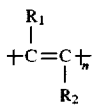

wherein $R_1$ is chosen from the group consisting of $C_1$–$C_4$ alkyl and phenyl, and wherein $R_2$ is chosen independently from the group consisting of hydrogen and phenyl, and the most preferred polymer is PMP.

As before, the membranes and modules may take any convenient form.

This first membrane separation step divides the feed stream 11 into permeate stream 14 and residue stream 13 under the influence of a transmembrane pressure difference. Criteria for obtaining a suitable driving force are the same as in the embodiment of FIG. 1, as are the preferred compositions of permeate stream 14, which is discharged from the process.

Residue stream 13 is higher in perfluoro compound concentration than feed stream 11, but is still too dilute for condensation under moderate conditions. This stream is passed to the feed side of second membrane separation step or unit, 15. This unit also contains membranes that are selective for nitrogen, air or other gas over the perfluoro compound. The membranes may be the same as or different from those in the first separation step.

The permeate stream, 17, from this step is not discharged, but is recirculated to the first separation step. Thus, it is in keeping with good chemical engineering practice to at least try to lower the perfluoro compound content of this stream to a value approaching that of stream 11. To do this, in conjunction with achieving a high concentration of the perfluoro compound in residue stream 16 requires a membrane of good selectivity. In addition, the volume of the recycle stream 17 is usually large, indeed may often be larger, such as 50% or 100% larger, than the volume of feed stream 11. Thus, it is desirable that the membranes used in the second membrane separation step exhibit high flux, because they will have to permeate comparatively large quantities of gas. In general it is preferred, therefore, that the membranes used in this second membrane separation step provide selectivity and flux of the same recommended orders as those used in the first step.

Residue stream, 16, from the second membrane separation step passes into condensation step 18.

As with the embodiment of FIG. 1, it is preferred to operate the condensation step at a temperature no lower than about –30° C., to keep it within the temperature range that can be reached by single-stage refrigeration. Higher condensation temperatures, as high as about 0° C. or above, or even as high as about 15° C. or above, are possible in favorable circumstances, particularly with some process modifications as discussed below. As was discussed in relation to the first embodiment, lesser amounts of dissolved gas are usually carried into the liquid product stream, 19, at higher condensation temperature.

The ability to tailor the membrane performance can be used in conjunction with the condensation temperature to achieve various results. On the one hand it is possible, if desired, to set the condenser temperature to a high enough value to keep the content of dissolved gas in the liquid perfluoro compound to a low level, such as no more than 1%, 2%, 3% or other value. On the other hand, a residue stream can be produced from the second membrane separation step that has a gas/perfluoro compound content such that all or most of the gas dissolves in the perfluoro compound liquid under the conditions of condensation. This avoids having to treat the off-gas stream from the condenser.

Any gas phase remaining after condensation is withdrawn as stream 20. Depending on the condensation conditions, the volume of this stream may be so small that it is acceptable simply to discharge it. For example, the stream may represent a discharge of less than 1 scfm or 1 lb/h of perfluoro compound.

Optionally and preferably, however, this stream is treated further, by recirculation or other downstream treatment, to eliminate emissions from the condenser altogether.

Such an arrangement is shown in FIG. 3, which also shows the optional use of a compressor to raise the feed stream pressure. In this embodiment, feed stream 21, which as before comprises a perfluoro compound and another gas or gases, passes through compressor 22, where the pressure is raised to any desired value, for example 200 psia, 300 psia, 400 psia, 500 psia, or less preferably, greater than 500 psia. Compressed stream 23 then passes into first membrane separation step 24, where it is separated into residue stream 25 and permeate stream 26. Permeate stream 26 is depleted in perfluoro compound and enriched in nitrogen, air or other gas, and is discharged from the process to the environment or another destination. Residue stream 25 passes to second membrane separation step 27, where it is separated into residue stream 28 and permeate stream 29. Permeate stream 29 is recirculated to the front of the process. FIG. 3 shows this stream as being mixed with the raw feed stream on the inlet side of compressor 22. It is also possible, of course, although less preferred, to recompress stream 29 separately and return it to the feed side of membrane step 24 downstream of compressor 22.

Residue stream 28 passes to condensation step 30. The liquefied perfluoro compound product is withdrawn from this step as stream 32. Uncondensed gas, saturated with perfluoro compound at the pressure and temperature of condensation, is withdrawn from the condenser as stream 31, and is recirculated to the inlet of the feed side of the second membrane separation step, as shown in the figure. Since this stream is small in comparison with stream 25, the membrane area needed for this step, and the compositions of streams 28 and 29, are only changed to a minor extent as a result of this recirculation.

Figure 4:
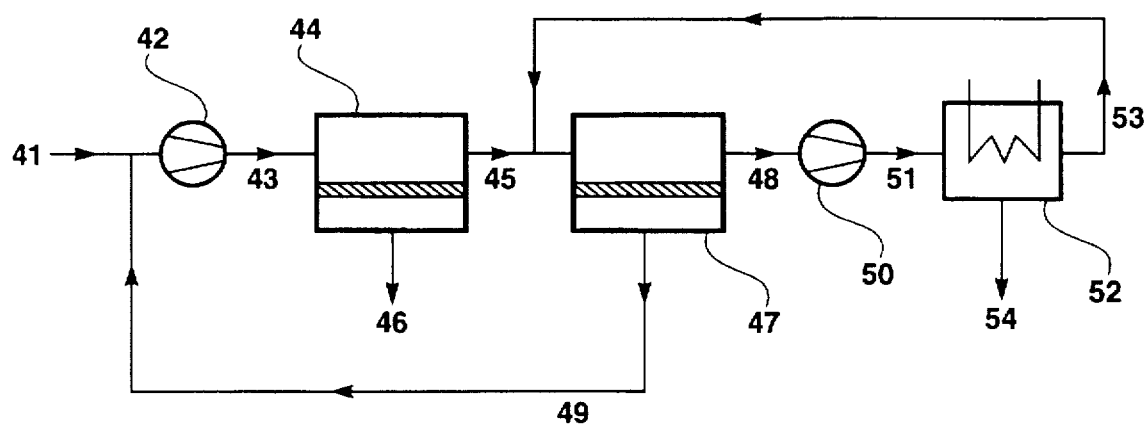
FIG. 4 is a schematic representation of a preferred embodiment of the invention that includes compression of the feed stream to the condensation step.

A slightly modified alternative to the arrangement of FIG. 3 is shown in FIG. 4. Referring to this figure, feed stream 41 passes through compressor 42, emerging as compressed stream 43, which is fed into first membrane separation step 44. Perfluoro-compound-depleted permeate stream 46 is withdrawn from this step. Residue stream 45 passes to second membrane separation step 47, where it is separated into residue stream 48 and permeate stream 49. Permeate stream 49 is recirculated to the front of the process. Residue stream 48 is then subjected to condensation step 52. Unlike the embodiment of FIG. 3, the condensation step is carried out by first boosting the pressure of stream 48 by means of compressor 50. For example, the membrane separation steps might be carried out at a feed pressure of about 100 psia or 200 psia, after which stream 48 is raised in pressure to 300 psia or 500 psia. This higher pressure facilitates both condensation of the perfluoro compound and recirculation of uncondensed gas, stream 53. Since stream 48 is typically small in volume compared with raw feed stream 41, the horse power requirement to raise just this portion of the feed to a higher pressure is generally much less than would be required if the whole of stream 41 was pressurized to the higher pressure. High pressure stream 51 emerges from the second compressor and is passed to condenser 52, from which the liquid perfluoro compound product is withdrawn as stream 54. Any uncondensed gas, stream 53, is passed back to the inlet side of second membrane separation step 47.

By raising stream 51 to a comparatively high pressure, such as 400 psia, 500 psia or above, good recovery of liquefied perfluoro compound can be obtained at comparatively high temperatures. It is even possible, as shown in the Examples section below, to obtain high levels of recovery of a low-boiling perfluorocarbon, such as perfluoroethane, by operating the condensation step using only cooling water or the like, without any refrigeration. As discussed above, it is also possible to configure the process so that all of the other gas remaining in stream 51 dissolves in the liquefied perfluoro compound, so that stream 53 is eliminated.

The arrangement of FIG. 4 is the most preferred embodiment for handling semiconductor industry cleaning compound waste streams.

As was mentioned above, the embodiment of FIG. 2 may include additional membrane or non-membrane treatment of the raw feed as appropriate upstream of the first membrane separation step 12, as well as additional membrane or non-membrane treatment of the uncondensed gas 20 downstream of the condensation step.

Figure 5:
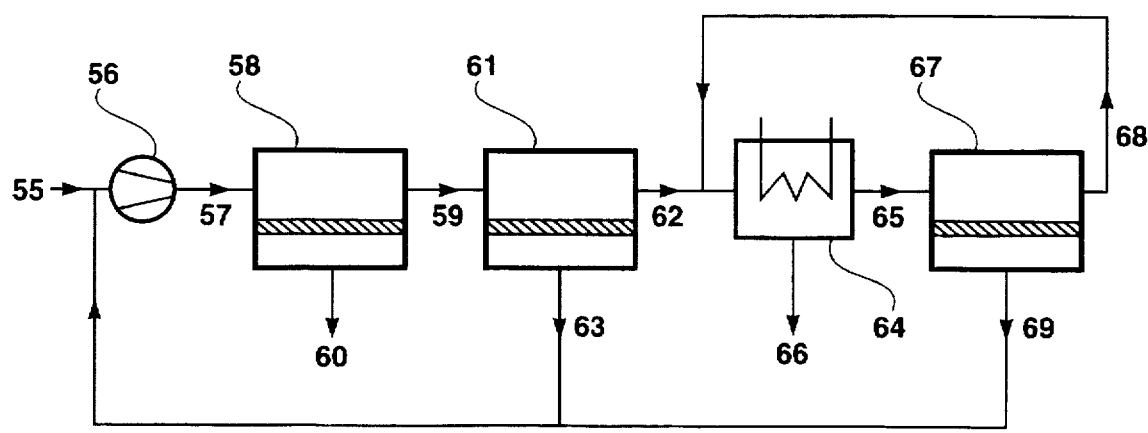
FIG. 5 is a schematic representation of a preferred embodiment of the invention that includes features of both basic embodiments.

An embodiment of this type that combines features of the two basic embodiments of FIGS. 1 and 2, and compression of the raw feed stream, is shown in FIG. 5. Referring to FIG. 5, it is clear that this arrangement can be viewed as similar to the embodiment of FIG. 1, but with an additional preliminary membrane separation step, or as similar to the embodiment of FIG. 2, but with an additional membrane separation step to treat the off-gas from the condenser.

In this case, feed stream 55 passes through optional compressor 56, emerging as compressed stream 57, which enters first membrane separation step 58, where it is separated into residue stream 59 and permeate stream 60. Permeate stream 60 is discharged from the process to the environment or another destination. Residue stream 59 passes to second membrane separation step 61, where it is separated into residue stream 62 and permeate stream 63. Permeate stream 63 is recirculated to the front of the process, and residue stream 62 passes to condensation step 64. The liquefied perfluoro compound product is withdrawn from this step as stream 66. Uncondensed gas is withdrawn from the condenser as stream 65, and is passed to third membrane separation step 67. The permeate stream, 69, from this step is recirculated to the inlet of the feed side of the first membrane separation step, and the residue stream, 68, is recirculated to the condensation step.

FIG. 5 shows the permeate streams from both the second and third membrane separation steps as recirculated to the feed side of the first membrane step. It will be apparent to those of skill in the art that any recirculated stream should, for preference, be reintroduced into the process train at a point where its composition most closely matches the composition of the stream under treatment at that point.

Therefore, the reentry points of all recirculated streams shown in the figures herein should be regarded as representative, rather than limiting, and the scope of the invention insofar as it involves recirculation, covers recirculation to any appropriate point.

Figure 6:
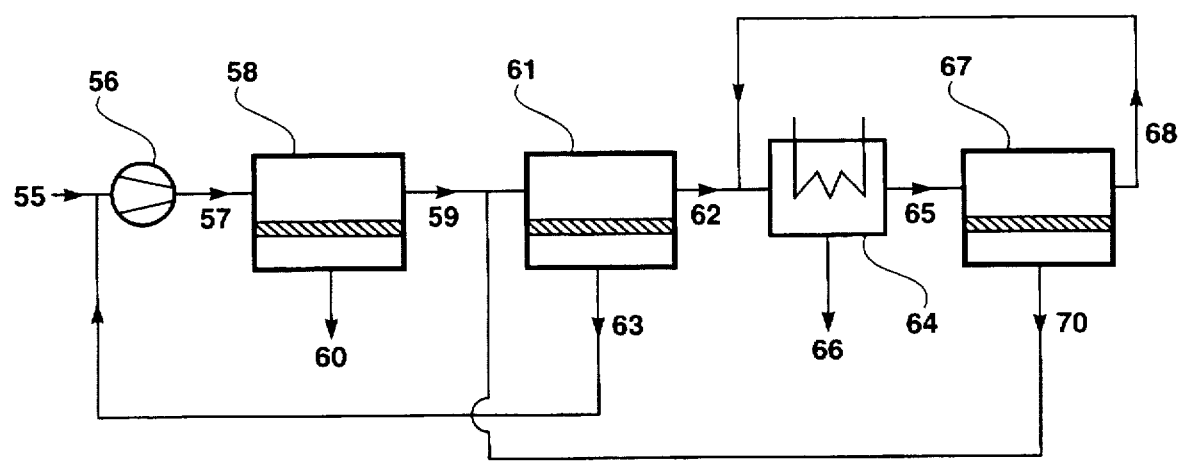
FIG. 6 is a schematic representation of a modified version of the embodiment of FIG. 5.

For example, if the composition of stream 69 is closer to that of stream 59 than to that of stream 55, then it is preferred to reintroduce it to the feed side of the second membrane separation step, as stream 70, as shown in FIG. 6.

Another arrangement, representative of many other possible arrangements, is shown in FIG. 7. Although this process configuration looks complicated, it can achieve a clean gas stream and a clean perfluoro compound product from a dilute feed with surprising economy of membrane area and compressor capacity, as shown in the examples below.

Feed stream 71 is compressed in compressor 72 and enters as compressed stream 73 into first membrane separation step 74, where it is separated into residue stream 75 and permeate stream 76. Permeate stream 76 is discharged from the process, and residue stream 75 passes to second membrane separation step 77, where it is separated into residue stream 78 and permeate stream 79. Permeate stream 79 is recirculated to the front of the process. Residue stream 78 passes to third membrane separation step 80 and is separated into residue stream 81 and permeate stream 82. Permeate stream 82 is shown as being passed to the low pressure side of the feed compressor for recompression and retreatment. Alternatively, stream 82 could be recompressed separately, as indicated in dashed lines by compressor 91, and returned as shown by dashed line 92 to the inlet of the second membrane separation step.

Residue stream 81 passes to condensation step 83. The liquefied perfluoro compound product is withdrawn as stream 85, and uncondensed gas stream 84 is withdrawn and passed to fourth membrane separation step 86. The permeate stream, 88, from this step is recompressed in compressor 89 and returned as stream 90 to the inlet of the third membrane separation step. Residue stream 87 is recirculated to the condensation step. It should be noted that, in this design, use of a compressor in some of the permeate lines can provide a subatmospheric pressure on the permeate side of the membrane, thereby increasing the driving force for the membrane separation.

The processes of the invention can be adapted easily to feed streams of widely diverse flow rates, ranging from 1 scfm or less to many thousands of scfm, by changing the membrane areas used in the membrane separation steps. The simplicity of the process, and the absence of sophisticated refrigeration equipment, makes possible the installation of a dedicated system at the source of the feed stream. As a result, it is possible, for example, where a semiconductor facility operates multiple chemical vapor deposition chambers, to provide a small membrane/condensation system to carry out the process of the invention as needed during the cleaning cycle of a single chamber. Alternatively, but less desirably, feed streams may be pooled for combined treatment by a central system.

The invention has been described so far as it concerns separation of perfluoro compounds from other gases. As was noted in the summary section above, the process arrangements disclosed are also useful for treating other gas mixtures containing an organic component, often as a minor component, but where no membranes are readily available that offer sufficient selectivity for the organic component over the other component, or where rubbery membranes are otherwise undesirable.

Specific examples of this type of mixture include petrochemical refinery streams containing hydrogen and various hydrocarbons, such as off gas streams from fluid catalytic crackers and the like. In such streams, the hydrogen may be present at concentrations varying from about 20% to about 80%, and it is desired to recover the hydrogen separately from the hydrocarbons. This separation could be carried out using organic-selective membranes to preferentially separate the hydrocarbons from the hydrogen. However, the hydrogen molecule is very small and hydrogen is not readily condensable, so glassy membranes typically exhibit high selectivity for hydrogen over hydrocarbons. The process of the invention, using hydrogen-selective membranes, may be preferred over the use of organic-selective membranes, therefore, especially where the organic-selective membranes offer comparatively low selectivity, such as in the separation of hydrogen from methane and hydrogen from ethane, for example.

A second example is associated gas, that is, the gas fraction produced in conjunction with oil from oil and gas wells. This gas is usually treated to separate methane and ethane from the heavier hydrocarbons. Separation of the light and heavier hydrocarbon fractions can be achieved using membranes selective for propane and the heavier hydrocarbons over methane, and process arrangements for so doing are described for example in co-owned and copending patent Ser. No. 08/789,371, entitled "Membrane Separation of Associated Gas", which is incorporated herein by reference in its entirety. As an alternative, this treatment could be carried out by the process of the invention to yield a gas stream containing 90% or more methane and ethane and a condensate stream containing the heavier hydrocarbons.

A third example is the separation of olefins, in particular ethylene and propylene, from nitrogen. Streams containing such gas mixtures arise during polymer manufacturing, where nitrogen is used to purge unreacted monomer, solvents, catalysts, stabilizers, other hydrocarbons or other materials from the raw polymer particles. This separation may be done by a process involving olefin-selective membranes, as is described in co-owned and copending patent application Ser. No. 08/789,377, entitled "Monomer Recovery Process", which is incorporated herein by reference in its entirety. As an alternative, the separation could be carried out by the process of the invention to yield a clean nitrogen stream for use in degassing the polymer resin.

Yet other examples include separation of mixtures of brominated hydrocarbons in nitrogen, such as might arise during manufacture or use of these compounds, and separation of hydrogen from ammonia during ammonia synthesis.

The invention is now illustrated in further detail by specific examples. These examples are intended to further clarify the invention, and are not intended to limit the scope in any way.

EXAMPLES

Example 1

Preparation of Polymer Films

Dense films of poly(1-trimethylsilyl-1-propyne) |PTMSP| were cast from a solution of 1 wt % PTMSP polymer in toluene. The films were cast onto glass plates, after which the solvent was evaporated for 24 hours at ambient conditions. The films were then dried in an oven at 80° C. for two days to completely remove the solvent. The thickness of the films, as determined with a precision micrometer, was 32 µm.

Dense films of poly(4-methyl-2-pentyne) |PMP| were cast from a solution of 1 wt % PMP polymer in carbon tetrachloride. The films were prepared as above. The thickness of the films, as determined with a precision micrometer, was 36 µm.

Dense films of poly(perfluoro-2,2-dimethyl-1,3-dioxole) |Teflon AF| were cast from a solution of 1 wt % Teflon AF 2400 polymer in perfluoroheptane. The films were prepared as above. The thickness of the films, as determined with a precision micrometer, was 18 µm.

Example 2

Pure Gas Properties of PTMSP Films

The pure gas permeation properties of the PTMSP films were determined with nitrogen, oxygen, perfluoromethane ($CF_4$), perfluoroethane ($C_2F_6$), and perfluoropropane ($C_3F_8$). Samples of the films prepared in Example 1 were cut into 12.6-$cm^2$ stamps and tested in a permeation test-cell apparatus with each of the pure gases at 25° C. feed temperature and 50 psig feed pressure. The pure-gas permeabilities of the PTMSP films, and the calculated oxygen/nitrogen and nitrogen/perfluorocarbon selectivities are shown in Table 1.

TABLE 1

Pure-Gas Permeabilities and Selectivities of Poly(1-trimethylsilyl-1-propyne) |PTMSP| at 50 psig and 25° C.

| Permeability (Barrer) | | | | | Selectivity | | | |
|---|---|---|---|---|---|---|---|---|
| $O_2$ | $N_2$ | $CF_4$ | $C_2F_6$ | $C_3F_8$ | $O_2/N_2$ | $N_2/CF_4$ | $N_2/C_2F_6$ | $N_2/C_3F_8$ |
| 13,040 | 8,990 | 5,060 | 1,460 | 1,410 | 1.5 | 1.8 | 6.2 | 6.4 |

The oxygen/nitrogen selectivities were equal to previous values determined for PTMSP, indicating that the films were defect-free. As is expected with high-free-volume polymers, the permeability to all the gases tested was high, including almost 9,000 Barrer (where 1 Barrer=$1 \times 10^{-10}$ $cm^3$(STP)cm/$cm^2$·s·cmHg) for nitrogen.

Unexpectedly, the PTMSP, which in other experiments we have found to exhibit super-glassy behavior, that is, to be organic-selective, was found to be selective for nitrogen over the perfluorocarbons tested. The selectivity was also low.

Example 3

Pure Gas Properties of PMP Films

The pure gas permeation properties of the PMP films prepared in Example 1 were determined as in Example 2.

The results are shown in Table 2.

TABLE 2

Pure-Gas Permeabilities and Selectivities of Poly(4-methyl-2-pentyne) [PMP] at 50 psig and 25° C.

| Permeability (Barrer) | | | | | Selectivity | | | |
|---|---|---|---|---|---|---|---|---|
| $O_2$ | $N_2$ | $CF_4$ | $C_2F_6$ | $C_3F_8$ | $O_2/N_2$ | $N_2/CF_4$ | $N_2/C_2F_6$ | $N_2/C_3F_8$ |
| 2,540 | 1,270 | 94 | 18 | 11 | 2.0 | 13.5 | 71 | 115 |

The PMP polymer also proved to be selective to nitrogen over the perfluoro compounds tested. The polymer is less permeable than PTMSP, but exhibited very high selectivity for nitrogen over the perfluoro compounds.

Example 4

Pure Gas Properties of Teflon AF 2400 Films

The pure gas permeation properties of the Teflon AF 2400 films prepared in Example 1 were determined as in Example 2. The pure-gas permeabilities of the Teflon films, and the calculated oxygen/nitrogen and nitrogen/perfluorocarbon selectivities are shown in Table 3.

TABLE 3

Pure-Gas Permeabilities and Selectivities of Teflon AF 2400 at 50 psig and 25° C.

| Permeability (Barrer) | | | | | Selectivity | | | |
|---|---|---|---|---|---|---|---|---|
| $O_2$ | $N_2$ | $CF_4$ | $C_2F_6$ | $C_3F_8$ | $O_2/N_2$ | $N_2/CF_4$ | $N_2/C_2F_6$ | $N_2/C_3F_8$ |
| 1,560 | 780 | 85 | 19 | 320 | 2.0 | 9.2 | 41 | 2.4 |

The permeabilities and selectivity in favor of nitrogen over perfluorocarbon were again high. The high permeability to perfluoropropane is probably caused by plasticization of the polymer by the permeating gas.

Example 5

Activity Dependence of Permeability of Polymer Films

The effect of the activity of the permeating perfluoroethane gas on permeability of PMP was examined by carrying out pure-gas permeation experiments as in Example 3, but varying the feed pressure P in increments of 10 psi over the range 10–120 psig. The ratio $P/P_{sat}$ was calculated, assuming a saturated vapor pressure $P_{sat}$ of 450 psia (435 psig) for perfluoroethane at 25° C., and was used as a measure of the activity of the gas.

The experiment was repeated using perfluoropropane over the feed pressure range 20–90 psig, assuming a saturated vapor pressure $P_{sat}$ of 128 psia (113 psig) for perfluoropropane at 25° C.

Figure 8:
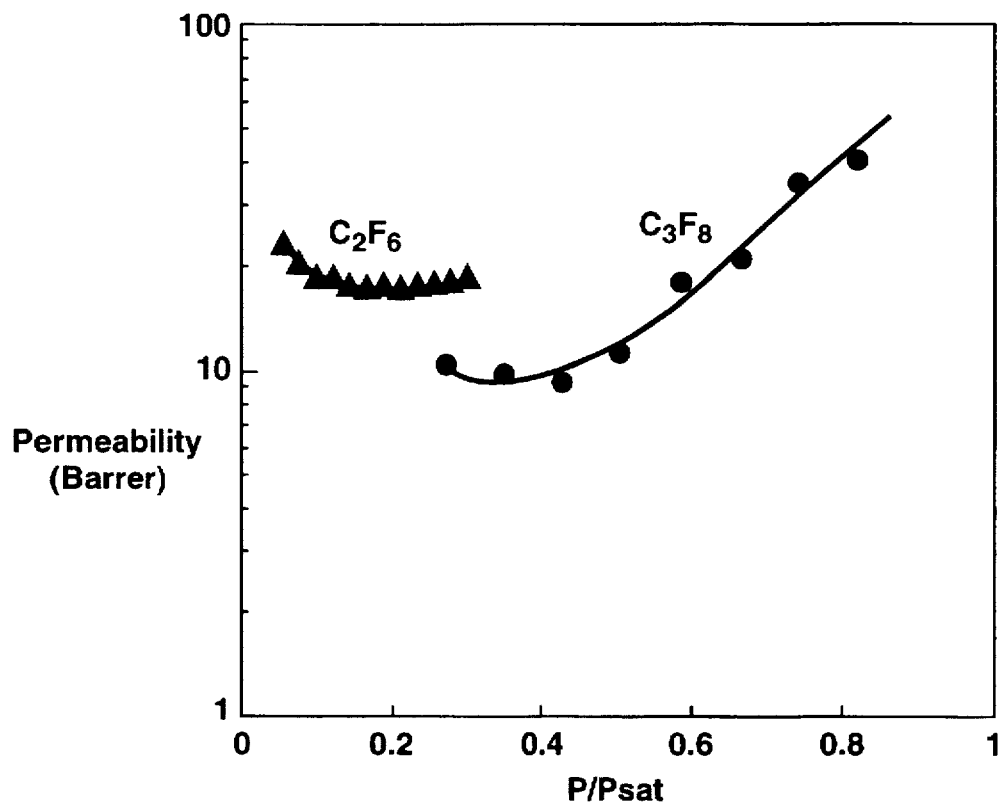
FIG. 8 is a graph of PMP polymer permeability as a function of permeating perfluoroethane activity.

The results are shown graphically in FIG. 8. The drop in permeability at low activity is normal for glassy polymers and reflects the non-linear dependence on pressure of the solubility component of the permeability at low feed pressure. As can be seen, the permeability of PMP to perfluoropropane increases significantly at higher activity. The perfluoroethane permeability was not measured at high activity, but would also be expected to increase.

Figure 9:
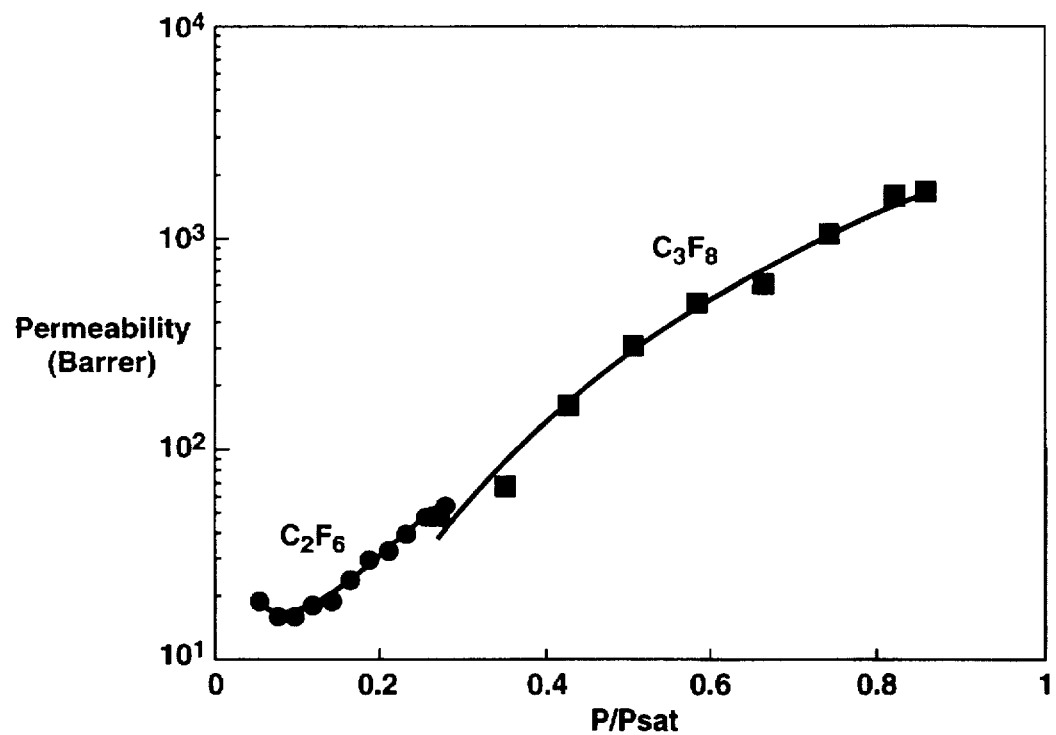
FIG. 9 is a graph of Teflon AF polymer permeability as a function of permeating perfluoroethane activity.

The experiments with perfluoroethane and perfluoropropane were repeated with Teflon AF films. The results are shown graphically in FIG. 9.

As can be seen, the relationship of permeability to activity shows the same general trends as in PMP. However, the overall increase in permeability with activity is much greater.

Example 6

Mixed-Gas Properties of PMP Films

PMP films prepared as in Example 1 were tested in a permeation test cell as in Example 4 with each of the following gas mixtures:

2 mol % perfluoromethane ($CF_4$) in nitrogen
2 mol % perfluoroethane ($C_2F_6$) in nitrogen
2 mol % perfluoropropane ($C_3F_8$) in nitrogen
2 mol % perfluorobutane ($C_4F_8$) in nitrogen The experiments were performed at 25° C. feed temperature and at 200 psig feed pressure; the permeate pressure was atmospheric (0 psig). The stage-cut, that is, the permeate flow rate to feed flow rate, was always less than 1%. Thus, the residue composition was essentially equal to the feed composition. The feed, residue, and permeate compositions were determined with a gas chromatograph equipped with a thermal conductivity detector.

The results of the mixed-gas permeation experiments for the PMP films are summarized in Table 4. As can be seen, the nitrogen/perfluorocarbon selectivities increase as the size of the perfluorocarbon increases. This behavior is typical for glassy polymer membranes.

TABLE 4

Gas Separation Properties of PMP Films with Gas Mixtures of 2 mol % Perfluorocarbon in Nitrogen at 25° C.

| Gas Composition | Permeability (Barrer) | | Selectivity | Permeability (Pure $N_2$/ Mixture $N_2$) |
|---|---|---|---|---|
| | Nitrogen | Perfluorocarbon | | |
| 100% $N_2$ | 1,270 | — | — | — |
| 2% $CF_4$ | 1,084 | 147 | 7.4 | 1.2 |
| 2% $C_2F_6$ | 943 | 41 | 23 | 1.3 |
| 2% $C_3F_8$ | 526 | 11 | 47 | 2.4 |
| 2% $C_4F_8$ | 378 | 0.75 | 505 | 3.4 |

Example 7

Mixed-Gas Properties of Teflon AF 2400 Films

Teflon AF 2400 films prepared as in Example 1 were tested as in Example 6 above. The results of the mixed-gas permeation experiments for the Teflon films are summarized in Table 5. Teflon AF 2400 showed similar selectivities but had significantly lower nitrogen permeability than PMP when tested with these gas mixtures.

TABLE 5

Gas Separation Properties of Teflon AF Films with Gas Mixtures of 2 mol % Perfluorocarbon in Nitrogen at 25° C.

| Gas Composition | Permeability (Barrer) Nitrogen | Permeability (Barrer) Perfluorocarbon | Selectivity | Permeability (Pure N₂/ Mixture N₂) |
|---|---|---|---|---|
| 100% N₂ | 780 | | | |
| 2% CF₄ | 726 | 119 | 6.9 | 1.1 |
| 2% C₂F₆ | 445 | 13.5 | 33 | 1.8 |
| 2% C₃F₈ | 317 | 3.7 | 84 | 2.5 |
| 2% C₄F₈ | 214 | 0.89 | 230 | 3.6 |

Example 8

Preparation of PMP Composite Membranes

A PMP composite membrane was made by dip-coating a poly(vinylidene fluoride) |PVDF| microporous support membrane in a solution of 1 wt % PMP polymer in cyclohexane on a continuous coating machine at 1 ft/min coating speed, then drying in an oven at 60° C. for 20 minutes. The resulting membranes had a selective layer thickness ranging from approximately 4 to 7 µm.

Example 9

Preparation of Teflon AF 2400 Composite Membranes

A Teflon AF 2400 composite membrane was made by dip-coating a poly(vinylidene fluoride) |PVDF| microporous support membrane in a solution of 1 wt % Teflon AF 2400 polymer in PF5070 solvent (3M, St. Paul, Minn.) on a continuous coating machine at 1 ft/min coating speed, then drying in an oven at 60° C. for 20 minutes. The resulting membranes had a selective layer thickness of approximately 0.7 µm.

Example 10

Preparation of Ethylcellulose Composite Membranes

An ethylcellulose composite membrane was made by dip-coating a poly(vinylidene fluoride) |PVDF| microporous support membrane in a solution of 1 wt % ethylcellulose polymer in isopropanol on a continuous coating machine at 1 ft/min coating speed, then drying in an oven at 60° C. for 20 minutes. The resulting membranes had a selective layer thickness of approximately 0.1 µm

Example 11

Preparation of Poly(phenylene oxide) Composite Membranes

A poly(phenylene oxide) composite membrane was made by wick-coating a poly(vinylidene fluoride) |PVDF| microporous support membrane with a solution of 1 wt % poly(phenylene oxide) polymer in toluene, then drying in an oven at 60° C. for 20 minutes. The resulting membranes had a selective layer thickness of approximately 0.2 µm.

Example 12

Preparation of Silicone Rubber Composite Membranes

A silicone rubber composite membrane was made by dip-coating a poly(vinylidene fluoride) |PVDF| microporous support membrane in a solution of 5 wt % silicone rubber in iso-octane on a continuous coating machine at 1 ft/min coating speed, then drying in an oven at 60° C. for 20 minutes. The resulting membranes had a selective layer thickness of about 4 µm.

Example 13

Pure Gas Properties of PMP Composite Membranes

Samples of the PMP membranes prepared in Example 8 were cut into 12.6 cm² stamps and tested in a permeation test-cell apparatus with pure oxygen, nitrogen, perfluoromethane (CF₄) and perfluoroethane (C₂F₆) at 25° C. feed temperature and 50 psig feed pressure. The gas fluxes of the membranes were measured, and the oxygen/nitrogen selectivities were calculated. Any membrane with a selectivity less than the intrinsic oxygen/nitrogen of the material was considered defective. Table 6 summarizes the results.

TABLE 6

Pure-Gas Permeabilities and Selectivities of PMP Composite Membranes

| Pressure-normalized Flux (10⁻⁶ cm³(STP)/cm² · s · cmHg) | | | | Selectivity | | |
|---|---|---|---|---|---|---|
| O₂ | N₂ | CF₄ | C₂F₆ | O₂/N₂ | N2/CF₄ | N2/C₂F₆ |
| 384 | 172 | 13.8 | 2.2 | 2.2 | 12 | 79 |

The results are consistent with the earlier film measurements.

Example 14

Pure Gas Properties of Teflon AF 2400 Composite Membranes

Samples of the Teflon AF membranes prepared in Example 9 were cut into 12.6 cm² stamps and tested in a permeation test-cell apparatus with pure oxygen, nitrogen, perfluoromethane (CF₄), perfluoroethane (C₂F₆), and perfluoropropane (C₃F₈) at 25° C. feed temperature and 50 psig feed pressure. The gas fluxes of the membranes were measured, and the oxygen/nitrogen selectivities were calculated. Any membrane with a selectivity less than the intrinsic oxygen/nitrogen of the material was considered defective. Table 7 summarizes the results.

TABLE 7

Pure-Gas Permeabilities and Selectivities of Teflon AF Composite Membranes

| Pressure-normalized Flux (10⁻⁶ cm³(STP)/cm² · s · cmHg) | | | | | Selectivity | | | |
|---|---|---|---|---|---|---|---|---|
| O₂ | N₂ | CF₄ | C₂F₆ | C₃F₈ | O₂/N₂ | N2/CF₄ | N₂/C₂F₆ | N₂/C₃F₈ |
| 2,170 | 1,130 | 166 | 48 | 628 | 1.9 | 6.8 | 24 | 1.8 |

The results are consistent with the earlier film measurements.

Example 15

Pure Gas Properties of Ethylcellulose Composite Membranes

Samples of the ethylcellulose membranes prepared in Example 10 were cut into 12.6 cm² stamps and tested in a permeation test-cell apparatus with pure oxygen, nitrogen, perfluoromethane ($CF_4$) and perfluoroethane ($C_2F_6$) at 25° C. feed temperature and 50 psig feed pressure. The gas fluxes of the membranes were measured, and the oxygen/nitrogen selectivities were calculated. Any membrane with a selectivity less than the intrinsic oxygen/nitrogen of the material was considered defective. Table 8 summarizes the results.

TABLE 8

Pure-Gas Permeabilities and Selectivities of Ethylcellulose Composite Membranes

| Pressure-normalized Flux ($10^{-6}$ $cm^3(STP)/cm^2 \cdot s \cdot cmHg$) | | | | Selectivity | | |
|---|---|---|---|---|---|---|
| $O_2$ | $N_2$ | $CF_4$ | $C_2F_6$ | $O_2/N_2$ | $N_2/CF_4$ | $N2/C_2F_6$ |
| 124 | 36.4 | 0.72 | 0.5 | 3.4 | 15 | 21 |

The ethylcellulose membranes exhibited lower overall performance than the PMP and Teflon AF membranes. They did, however, exhibit the best selectivity for nitrogen over perfluoromethane.

Example 16

Pure Gas Properties of Poly(phenylene oxide) Composite Membranes

Samples of the poly(phenylene oxide) composite membranes prepared in Example 11 were cut into 12.6 $cm^2$ stamps and tested in a permeation test-cell apparatus with pure oxygen and nitrogen at 25° C. feed temperature and 50 psig feed pressure. The gas fluxes of the membranes were measured, and the oxygen/nitrogen selectivity was calculated. Table 9 summarizes the results.

TABLE 9

Pure-Gas Permeabilities and Selectivities of Poly(phenylene oxide) Composite Membranes

| Pressure-normalized Flux ($10^{-6}$ $cm^3(STP)/cm^2 \cdot s \cdot cmHg$) | | Selectivity |
|---|---|---|
| $O_2$ | $N_2$ | $O_2/N_2$ |
| 48.9 | 11.2 | 4.2 |

Based on these results, the membranes appeared to be defect-free.

Example 17

Pure-Gas Flux of PMP Composite Membrane as a Function of Feed Pressure

Figure 10:
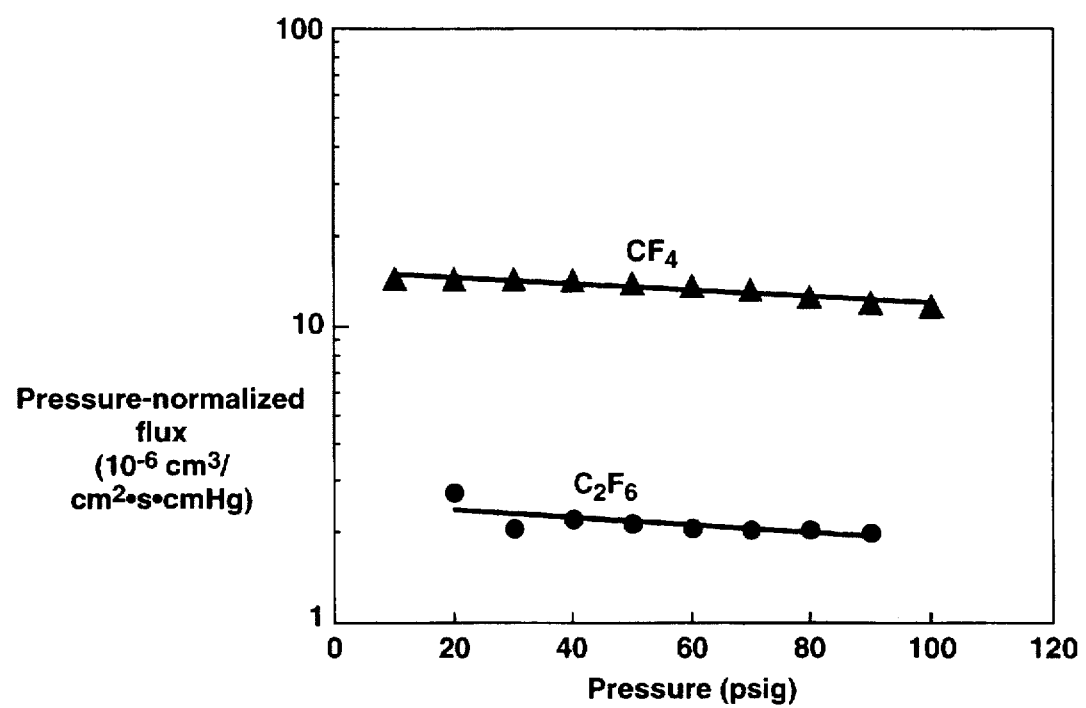
FIG. 10 is a graph showing the pressure dependence of pressure-normalized fluxes of perfluorocarbons for a PMP composite membrane.

A PMP composite membrane prepared as in Example 8 was tested in the permeation test cell as in Example 13, except that the feed pressure was varied from 10 to 170 psig. The pressure dependence of the fluxes of perfluoromethane and perfluoroethane is shown in FIG. 10.

The flux of perfluoromethane was found to be essentially constant, at 14×$10^{-6}$ ($cm^3(STP)/cm^2 \cdot s \cdot cmHg$), over the feed pressure range 10–100 psig. The flux of perfluoroethane was found to be essentially constant, at 2×$10^{-6}$ ($cm^3(STP)/cm^2 \cdot s \cdot cmHg$), over the range 20–90 psig. This indicates that the PMP is not plasticized by the perfluorocarbons in this pressure range.

Example 18

Pure-Gas Flux of Teflon AF Composite Membrane as a Function of Feed Pressure

Figure 11:
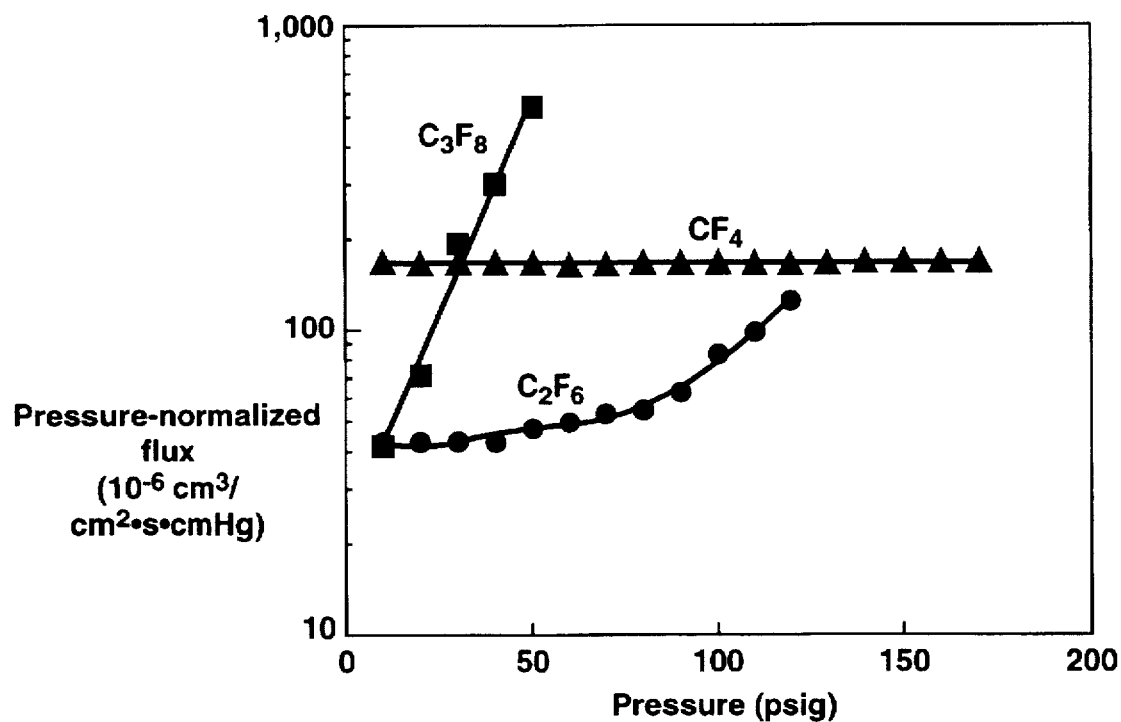
FIG. 11 is a graph showing the pressure dependence of pressure-normalized fluxes of perfluorocarbons for a Teflon AF composite membrane.

A Teflon AF 2400 composite membrane prepared as in Example 9 was tested in the permeation test cell as in Example 14, except that the feed pressure was varied from 10 to 170 psig. The pressure dependence of the fluxes of perfluoromethane, perfluoroethane, and perfluoropropane is shown in FIG. 11. The perfluoromethane flux was found to remain at about 170×$10^{-6}$ ($cm^3(STP)/cm^2 \cdot s \cdot cmHg$) over the feed pressure range 10–170 psig. However, the perfluoroethane flux increased substantially, from 43×$10^{-6}$ ($cm^3(STP)/cm^2 \cdot s \cdot cmHg$) to 126×$10^{-6}$ ($cm^3(STP)/cm^2 \cdot s \cdot cmHg$), as the feed pressure increased from 10 to 120 psig. The flux of perfluoropropane increased even more significantly, from 42×$10^{-6}$ ($cm^3(STP)/cm^2 as$ $cmHg$) at 10 psig to 544×$10^{-6}$ ($cm^3(STP)/cm^2 \cdot s \cdot cmHg$) at 50 psig. These results indicate that the Teflon AF 2400 is easily plasticized by perfluorocarbons over this pressure range.

Example 19

Mixed-Gas Properties of PMP Composite Membranes

PMP composite membranes prepared as in Example 8 were tested in a permeation test cell with the following gas mixtures:

2 mol % perfluoromethane ($CF_4$) in nitrogen
2 mol % perfluoroethane ($C_2F_6$) in nitrogen
2 mol % perfluoropropane ($C_3F_8$) in nitrogen
2 mol % perfluorobutane ($C_4F_8$) in nitrogen The experiments were performed at 25° C. feed temperature and at 200 psig feed pressure; the permeate pressure was atmospheric (0 psig). The stage-cut, that is, the permeate flow rate to feed flow rate, was always less than 1%. Thus, the residue composition was essentially equal to the feed composition. The feed, residue, and permeate compositions were determined with a gas chromatograph equipped with a thermal conductivity detector.

The results are summarized in Table 10. As can be seen, the nitrogen/perfluorocarbon selectivities increase as the size of the perfluorocarbon increases. The results were found to be consistent with the earlier mixed gas data obtained with PMP films.

TABLE 10

Gas Separation Properties of PMP Composite Membranes with Gas Mixtures of 2 mol % Perfluorocarbon in Nitrogen at 25° C.

| Gas Composition | Pressure-Normalized Flux ($10^{-6}$ $cm^3(STP)/cm^2 \cdot s \cdot cmHg$) | | Selectivity | Flux (Pure $N_2$/ Mixture $N_2$) |
|---|---|---|---|---|
| | Nitrogen | Perfluorocarbon | | |
| 100% $N_2$ | 61 | — | — | — |
| 2% $CF_4$ | 56 | 5.8 | 9.8 | 1.1 |
| 2% $C_2F_6$ | 47 | 1.2 | 41 | 1.3 |
| 2% $C_3F_8$ | 28 | 0.37 | 75 | 2.2 |
| 2% $C_4F_8$ | 18 | 0.28 | 67 | 3.4 |

Example 20

Mixed-Gas Properties of Teflon AF 2400 Composite Membranes

Teflon AF 2400 composite membranes prepared as in Example 9 were tested with mixed gases as in Example 19 above. The results are summarized in Table 11. Overall, the selectivities of the Teflon composite membranes were lower than those of the PMP composite membranes.

TABLE 11

Gas Separation Properties of Teflon AF Composite Membranes with Gas Mixtures of 2 mol % Perfluorocarbon in Nitrogen at 25° C.

| Gas Composition | Pressure-Normalized Flux ($10^{-6}$ cm$^3$(STP)/cm$^2 \cdot$ s $\cdot$ cmHg) | | | Flux (Pure N$_2$/ Mixture N$_2$) |
|---|---|---|---|---|
| | Nitrogen | Perfluorocarbon | Selectivity | |
| 100% N$_2$ | 291 | — | — | — |
| 2% CF$_4$ | 274 | 49 | 5.6 | 1.1 |
| 2% C$_2$F$_6$ | 234 | 11 | 21 | 1.2 |
| 2% C$_3$F$_8$ | 159 | 4.6 | 34 | 1.8 |
| 2% C$_4$F$_8$ | 97 | 2.4 | 41 | 3.0 |

Example 21

Mixed-Gas Properties of Ethylcellulose Composite Membranes

An ethylcellulose composite membrane was made by wick-coating a solution of 1 wt % ethylcellulose in isopropanol onto a poly(etherimide) |PEI| microporous support, then drying in an oven at 60° C. for 20 minutes. The resulting membranes had a selective layer thickness of approximately 1.3 μm.

The membranes were tested with mixed gases as in Example 19 above. The results are summarized in Table 12. As can be seen, the nitrogen flux is lower and the nitrogen/perfluorocarbon selectivity is lower than calculated from the pure gas experiments.

TABLE 12

Gas Separation Properties of Ethylcellulose Composite Membranes with Gas Mixtures of 2 mol % Perfluorocarbon in Nitrogen at 25° C.

| Gas Composition | Pressure-Normalized Flux ($10^{-6}$ cm$^3$(STP)/ cm$^2 \cdot$ s $\cdot$ cmHg) | | | Flux (Pure N$_2$/ Mixture N$_2$) |
|---|---|---|---|---|
| | Nitrogen | Perfluorocarbon | Selectivity | |
| 100% N$_2$ | 9.0 | — | — | — |
| 2% CF$_4$ | 7.7 | 0.74 | 10 | 1.2 |
| 2% C$_2$F$_6$ | 8.5 | 0.56 | 15 | 1.1 |
| 2% C$_4$F$_8$ | 7.3 | 1.53 | 14 | 1.2 |

Example 22

Mixed-Gas Properties of Poly(Phenylene Oxide) Composite Membranes

Poly(phenylene oxide) composite membranes prepared as in Example 11 were tested with mixed gases as in Example 19 above. The results are summarized in Table 13.

TABLE 13

Gas Separation Properties of Poly(phenylene oxide) Composite Membranes with Gas Mixtures of 2 mol % Perfluorocarbon in Nitrogen at 25° C.

| Gas Composition | Pressure-Normalized Flux ($10^{-6}$ cm$^3$(STP)/ cm$^2 \cdot$ s $\cdot$ cmHg) | | | Flux (Pure N$_2$/ Mixture N$_2$) |
|---|---|---|---|---|
| | Nitrogen | Perfluorocarbon | Selectivity | |
| 100% N$_2$ | 11.5 | — | — | — |
| 2% CF$_4$ | 5.5 | 0.57 | 9.6 | 2.1 |
| 2% C$_2$F$_6$ | 5.4 | 0.54 | 10 | 2.1 |

Example 23

Mixed-Gas Properties of Silicone Rubber Composite Membranes

Silicone rubber composite membranes prepared as in Example 12 were tested with mixed gases as in Example 19 above. The results are summarized in Table 14.

TABLE 14

Gas Separation Properties of Silicone Rubber Composite Membranes with Gas Mixtures of 2 mol % Perfluorocarbon in Nitrogen at 25° C.

| Gas Composition | Pressure-Normalized Flux ($10^{-6}$ cm$^3$(STP)/ cm$^2 \cdot$ s $\cdot$ cmHg) | | | Flux (Pure N$_2$/ Mixture N$_2$) |
|---|---|---|---|---|
| | Nitrogen | Perfluorocarbon | Selectivity | |
| 100% N$_2$ | 76 | — | — | — |
| 2% C$_3$F$_8$ | 73 | 46 | 1.6 | 1.04 |

As can be seen, at this temperature the rubbery membranes exhibited a low selectivity in favor of nitrogen over perfluoropropane.

Example 24

Comparison of Selectivities of Composite Membranes

The results from the composite membrane experiments for the perfluoroethane/nitrogen mixture are summarized in Table 15.

TABLE 15

Permeation Properties of Composite Membranes for Perfluoroethane/ Nitrogen Gas Mixture

| Membrane Type | Selectivity (O$_2$/N$_2$) | Pressure-Normalized Nitrogen Flux ($10^{-6}$ cm$^3$(STP)/cm$^2 \cdot$ s $\cdot$ cmHg | Selectivity (N$_2$/C$_2$F$_6$) |
|---|---|---|---|
| Poly(phenylene oxide) | 4.2 | 5.4 | 10 |
| Ethylcellulose | 3.7 | 8.5 | 15 |
| PMP | 2.2 | 142 | 40 |
| Teflon AF | 1.9 | 240 | 21 |

As can be seen, in general the materials with the poorer selectivity for oxygen over nitrogen exhibited the better selectivity for nitrogen over perfluoroethane.

Example 25

Effect of Feed Concentration on PMP Composite Membrane Properties

PMP membranes prepared as in Example 8 were tested with mixtures of perfluoroethane in nitrogen having perfluoroethane content of 2 mol %, 20 mol % and 50 mol %. The experimental method was as in Example 19. The nitrogen/perfluoroethane selectivity results are summarized in Table 16.

TABLE 16

Selectivity of PMP Composite Membranes with Different Concentration Gas Mixtures at 25° C.

| $C_2F_6$ content of gas (mol %) | Selectivity |
| --- | --- |
| 2 | 41 |
| 20 | 38 |
| 50 | 27 |

As can be seen, the selectivity declined with increasing perfluorocarbon content in the feed gas. This result is consistent with the earlier pressure and activity data.

Example 26

Effect of Feed Concentration on Teflon AF Composite Membrane Properties

Teflon AF membranes prepared as in Example 9 were tested with mixtures of perfluoroethane in nitrogen having perfluoroethane content of 2 mol %, 20 mol % and 50 mol %. The experimental method was as in Example 19. The nitrogen/perfluoroethane selectivity results are summarized in Table 17.

TABLE 17

Selectivity of Teflon AF Composite Membranes with Different Concentration Gas Mixtures at 25° C.

| $C_2F_6$ content of gas (mol %) | Selectivity |
| --- | --- |
| 2 | 21 |
| 20 | 13 |
| 50 | 5 |

As can be seen, the selectivity again declined as expected with increasing perfluorocarbon content, and hence activity.

Example 27

Aging Properties of PMP Composite Membrane at 85° C.

Figure 12:
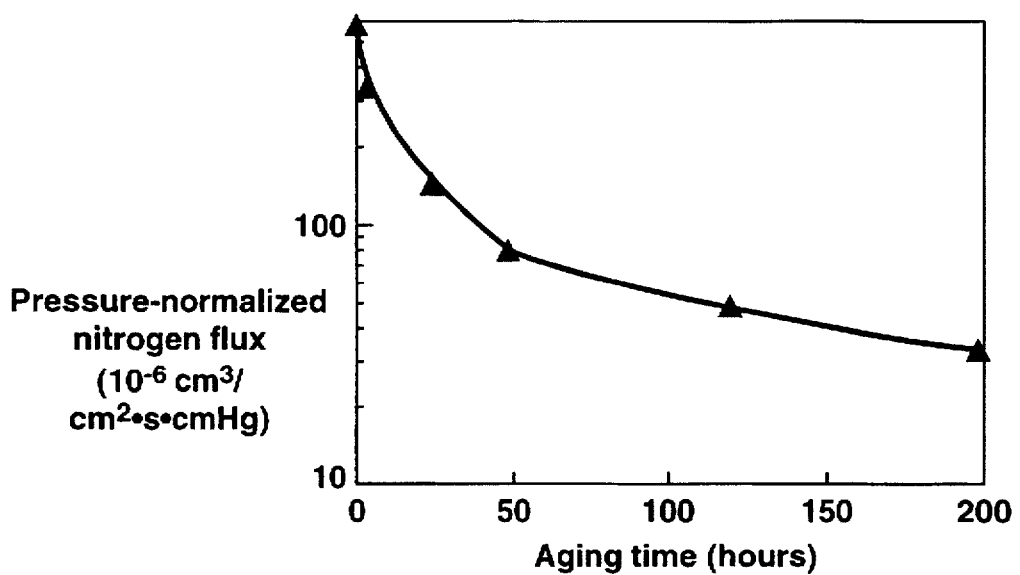
FIG. 12 is a graph showing the mixed gas pressure-normalized nitrogen flux of a PMP composite membrane as a function of aging time.
Figure 13:
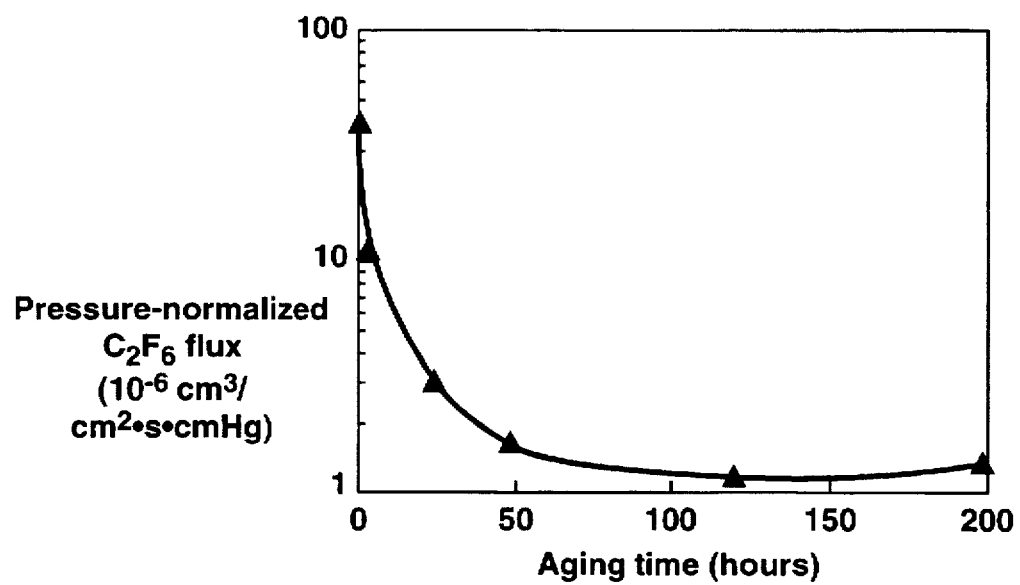
FIG. 13 is a graph showing the mixed gas pressure-normalized perfluoroethane flux of a PMP composite membrane as a function of aging time.

A PMP composite membrane prepared as in Example 8 was aged in an oven at 85° C. for over 200 hours. During this time, the gas permeation properties of the membrane were tested periodically in the permeation test-cell. For these tests, the feed gas mixture was 2 mol % perfluoroethane/98 mol % nitrogen. The feed temperature was 25° C., the feed pressure was 200 psig, and the permeate pressure was atmospheric. FIGS. 12 and 13 show the mixed-gas pressure-normalized fluxes of nitrogen and perfluoroethane, respectively. As can be seen, the mixed-gas nitrogen flux decreased from $568\times10^{-6}$ cm$^3$(STP)/cm$^2$·s·cmHg to $32\times10^{-6}$ cm$^3$(STP)/cm$^2$·s·cmHg after 200 hours. The mixed-gas perfluoroethane flux decreased from $40\times10^{-6}$ cm$^3$(STP)/cm$^2$·s·cmHg to $1.4\times10^{-6}$ cm$^3$(STP)/cm$^2$·s·cmHg after 200 hours.

Figure 14:
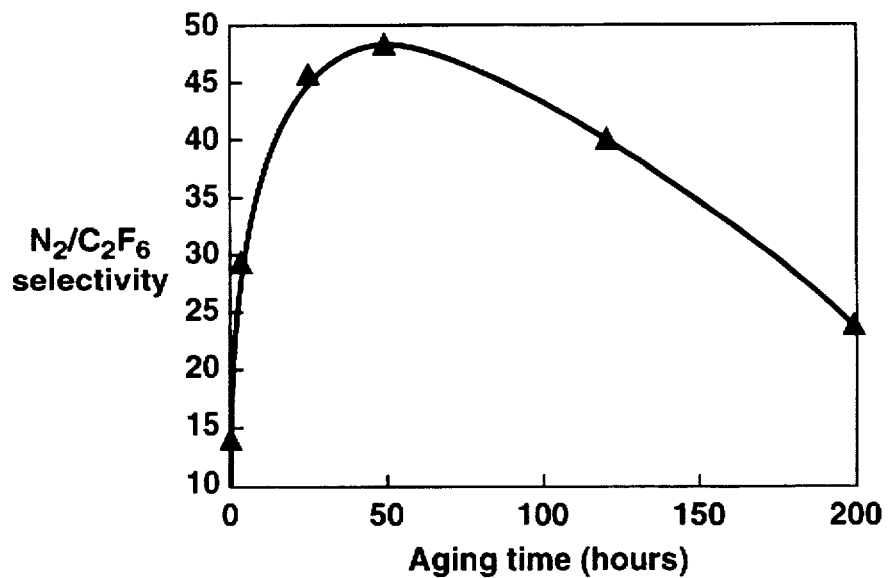
FIG. 14 is a graph showing the mixed gas nitrogen/perfluoroethane selectivity of a PMP composite membrane as a function of aging time.

FIG. 14 shows the change in the nitrogen/perfluoroethane selectivity over the 200-hour aging process. The selectivity reaches a maximum of 48 after 48 hours, then decreases to 24 after 200 hours.

The loss of flux and selectivity was assumed to be caused by loss of free volume.

Example 28

Aging Properties of PMP Composite Membrane at 65° C.

The experiment of Example 27 was repeated, this time carrying out the aging at 65° C. In this case, the selectivity dropped more slowly. After 120 hours it had dropped to 61, compared to 40 for the membrane aged at 85° C.

Thereafter, the membrane was stored at room temperature for 24 days, after which it was tested again and determined to have a nitrogen/perfluoroethane selectivity of 33. Even after prolonged aging, therefore, the PMP membranes retained high flux and selectivity compared with other materials.

Examples 29–37

Computer Calculations

A set of computer calculations was performed to illustrate representative embodiments of the process of the invention. In each case, the calculation was performed using the modelling program ChemCad III (ChemStations, Inc., Houston, Tex.), to simulate the separation. For Examples 29–32, the membrane separation steps were assumed to contain the same membranes having the following permeation properties:

In first step:

Nitrogen pressure-normalized flux: $50\times10^{-6}$ cm$^3$(STP)/cm$^2$·s·cmHg

Nitrogen/perfluoroethane selectivity: 30

In subsequent steps:

Nitrogen pressure-normalized flux: $20\times10^{-6}$ cm$^3$(STP)/cm$^2$·s·cmHg

Nitrogen/perfluoroethane selectivity: 10

The lower flux and selectivity in the subsequent membrane separation steps were chosen to take account of the higher perfluorocarbon concentration and lower temperature to which these membranes might be exposed.

Example 29

A calculation was performed to model the removal of perfluoroethane from nitrogen. The process configuration was assumed to be as shown in FIG. 3. The feed gas entering through line 21 was assumed to be a 50-scfm nitrogen stream containing 2 mol % perfluoroethane, and to be compressed to a pressure of 200 psia by compressor 22. The nitrogen permeate is recovered as stream 26. The residue is fed to the second membrane unit, 27. Permeate stream 29 contains 1.4 mol % perfluoroethane and is returned to the front of the process for additional treatment. Perfluoroethane-enriched residue stream 28 is passed to the condenser, assumed to operate at −30° C., from which liquid perfluoroethane is recovered as stream 32. Stream 31, containing about 62 mol % perfluoroethane, is returned to the second membrane separation step.

The calculated compositions and flow rates of the streams are shown in Tables 18 and 19, where stream numbers are as in FIG. 3.

TABLE 18

| Stream | 21 | 23 | 25 | 26 | 28 | 29 | 31 | 32 |
|---|---|---|---|---|---|---|---|---|
| Flow (lbmol/h) | 8.4 | 23.0 | 14.8 | 8.2 | 0.2 | 14.7 | 0.04 | 0.2 |
| Temp. (°C.) | 25 | 25 | 11 | 11 | −24 | −24 | −30 | −30 |
| Pressure (psia) | 15 | 200 | 200 | 15 | 200 | 15 | 200 | 200 |

TABLE 18-continued

| Stream | 21 | 23 | 25 | 26 | 28 | 29 | 31 | 32 |
|---|---|---|---|---|---|---|---|---|
| Component (mol %): | | | | | | | | |
| Perfluoroethane | 2.0 | 1.6 | 2.5 | 0.1 | 90.0 | 1.4 | 62.3 | 96.6 |
| Nitrogen | 98.0 | 98.4 | 97.5 | 99.9 | 10.0 | 98.6 | 37.7 | 3.4 |

TABLE 19

| Stream | 21 | 23 | 25 | 26 | 28 | 29 | 31 | 32 |
|---|---|---|---|---|---|---|---|---|
| Flow (lb/h) | 252 | 687 | 457 | 230 | 26.2 | 434 | 3.8 | 22.4 |
| Component flow (lb/h): | | | | | | | | |
| Perfluoroethane | 23.1 | 51.9 | 51.0 | 0.8 | 25.7 | 28.8 | 3.4 | 22.2 |
| Nitrogen | 229 | 635 | 406 | 229 | 0.6 | 405 | 0.4 | 0.2 |

Membrane area required: First unit: 49 m² Second unit: 244 m²

Horsepower requirement: 32 hp

As can be seen from the tables, the process recovered 22.2 lb/h of perfluorocarbon from a feed of 23.1 lb/h of perfluorocarbon, a recovery of over 96%. The nitrogen stream is 99.9% pure nitrogen, and the perfluorocarbon stream contains 3.4% dissolved nitrogen.

Example 30

A calculation was performed assuming the same feed stream composition and flow rate as in Example 29. The feed gas was again assumed to be compressed to 200 psia. In this case, the process configuration was assumed to be as in FIG. 4, that is, a small additional compressor was assumed to be positioned between the second membrane unit and the condenser to boost the condensation pressure. A pressure of 500 psia was chosen for this compressor. For this calculation, the condenser was assumed to be cooled only to 15° C., such as by cool water. The calculated compositions and flow rates of the streams are shown in Tables 20 and 21, where stream numbers are as in FIG. 4.

TABLE 20

| Stream | 41 | 43 | 45 | 46 | 48 | 49 | 51 | 53 | 54 |
|---|---|---|---|---|---|---|---|---|---|
| Flow (lbmol/h) | 8.4 | 23.9 | 15.7 | 8.2 | 0.2 | 15.6 | 0.2 | 0 | 0.2 |
| Temp. (°C.) | 25 | 50 | 37 | 37 | −1 | −1 | 50 | — | 15 |
| Pressure (psia) | 15 | 200 | 200 | 15 | 200 | 15 | 500 | — | 500 |
| Component (mol %): | | | | | | | | | |
| Perfluoroethane | 2.0 | 1.7 | 2.5 | 0.1 | 95.0 | 1.5 | 95.0 | 0 | 95.0 |
| Nitrogen | 98.0 | 98.3 | 97.5 | 99.9 | 5.0 | 98.5 | 5.0 | 0 | 5.0 |

TABLE 21

| Stream | 41 | 43 | 45 | 46 | 48 | 49 | 51 | 53 | 54 |
|---|---|---|---|---|---|---|---|---|---|
| Flow (lb/h) | 252 | 714 | 484 | 230 | 22.5 | 461 | 22.5 | 0 | 22.5 |
| Component flow (lb/h): | | | | | | | | | |
| Perfluoroethane | 23.1 | 54.9 | 54.0 | 0.9 | 22.2 | 31.8 | 22.2 | 0 | 22.2 |
| Nitrogen | 229 | 659 | 430 | 229 | 0.2 | 429 | 0.2 | 0 | 0.2 |

Membrane area required: First unit: 49 m² Second unit: 260 m²

Horsepower requirement: First Compressor: 36 hp Second Compressor: 0.04 hp

As can be seen, the process, although operating at 15° C., was able to achieve the same levels of perfluorocarbon recovery and nitrogen product purity as in Example 29. However, all of the nitrogen gas that reached the condensation step was dissolved in the liquefied perfluorocarbon, so under these conditions, there was no return stream 53. The process uses very little more membrane area and compressor horsepower that the process of Example 29.

Example 31

A calculation was performed assuming the same feed stream composition and flow rate as in Examples 29 and 30. The feed gas was again assumed to be compressed to 200 psia. In this case, the process configuration was assumed to be as in FIG. 5, that is, a third membrane separation step was assumed to be used to treat the off-gas from the condenser. The condensation step was assumed to be performed at 200 psia and −30° C. The calculated compositions and flow rates of the streams are shown in Tables 22 and 23, where stream numbers are as in FIG. 5.

TABLE 22

| Stream | 55 | 57 | 59 | 60 | 62 | 63 | 65 | 66 | 68 | 69 |
|---|---|---|---|---|---|---|---|---|---|---|
| Flow (lbmol/h) | 8.4 | 22.4 | 14.2 | 8.2 | 0.2 | 14.1 | 0.04 | 0.2 | 0.02 | 0.02 |
| Temp. (°C.) | 25 | 25 | 11 | 11 | −24 | −24 | −30 | −30 | −17 | −17 |
| Pressure (psia) | 15 | 200 | 200 | 15 | 200 | 15 | 200 | 200 | 200 | 15 |
| Component (mol %): | | | | | | | | | | |
| Perfluoroethane | 2.0 | 1.6 | 2.5 | 0.1 | 90.0 | 1.3 | 62.3 | 96.6 | 90.0 | 29.8 |
| Nitrogen | 98.0 | 98.4 | 97.5 | 99.1 | 10.0 | 98.7 | 37.7 | 3.4 | 10.0 | 70.2 |

TABLE 23

| Stream | 55 | 57 | 59 | 60 | 62 | 63 | 65 | 66 | 68 | 69 |
|---|---|---|---|---|---|---|---|---|---|---|
| Flow (lb/h) | 252 | 668 | 438 | 230 | 23.5 | 415 | 3.8 | 22.4 | 2.7 | 1.1 |
| Component flow (lb/h): | | | | | | | | | | |
| Perfluoroethane | 23.1 | 50.0 | 49.1 | 0.8 | 23.0 | 26.2 | 3.4 | 22.2 | 2.6 | 0.7 |
| Nitrogen | 229 | 618 | 389 | 229 | 0.5 | 389 | 0.4 | 0.2 | 0.1 | 0.4 |

Membrane area required: First unit: 49 m² Second unit: 233 m² Third unit: 1 m²

Horsepower requirement: 32 hp

This process arrangement was able to achieve results as in Examples 29 and 30. The membrane area requirement for the third membrane separation step is extremely small.

Example 32

A calculation was performed assuming the same feed stream composition and flow rate as in Examples 29–31. The feed gas was again assumed to be compressed to 200 psia. In this case, the process configuration this time was assumed to be as in FIG. 7, with stream 82 recompressed to 200 psia by compressor 91 and returned to the front of the second membrane separation step, and stream 88 recompressed in compressor 89 and returned to the front of the third membrane separation step. The condensation step was assumed to be performed at 200 psia and −30° C. The calculated compositions and flow rates of the feed and product streams are shown in Table 24, where stream numbers are as in FIG. 7.

TABLE 24

| Stream | 71 | 76 | 85 |
|---|---|---|---|
| Temperature (°C.) | 25 | 5 | −30 |
| Pressure (psia) | 15 | 15 | 200 |
| Flow (lb/h) | 252 | 230 | 22.1 |
| Component flow (lb/h) | | | |
| Perfluoroethane | 23.1 | 1 | 22.0 |
| Nitrogen | 229 | 229 | 0.1 |

Membrane area required: First unit: 25 m² Second unit: 25 m² Third unit: 9.5 m² Fourth unit: 6 m²

Horsepower requirement: First compressor (72): 31 hp Second compressor (91): 0.5 hp Third compressor (89): 0.2 hp This process arrangement was able to achieve results as in the previous examples, using a comparatively small amount of membrane area and compressor horsepower.

Example 33

A calculation was performed to evaluate the performance of the process of the invention in separating a 1,000-scfm associated gas stream containing a mixture of $C_1$–$C_6$ hydrocarbons. The configuration of FIG. 5 was assumed to be used. The goal was to produce a gas stream from which the bulk of the $C_{3+}$ hydrocarbons have been removed, in conjunction with a natural gas liquid (NGL) product containing no more than about 5% methane. The feed gas was assumed to be at 150 psia, so that no initial compressor 56 was required. Instead a compressor was assumed to be used in the return line to recompress streams 63 and 69 to 150 psia. The condensation temperature was assumed to be −20° C.

The process was assumed to be carried out using, for all membrane separation steps, a membrane having the following pressure-normalized fluxes, which might be representative of a polyimide membrane, for example:

Methane: $100 \times 10^{-6}$ cm³(STP)/cm²·s·cmHg
Ethane: $10 \times 10^{-6}$ cm³(STP)/cm²·s·cmHg
Propane: $3 \times 10^6$ cm³(STP)/cm²·s·cmHg
n-Butane: $2 \times 10^{-6}$ cm³(STP)/cm²·s·cmHg
n-Pentane: $1 \times 10^{-6}$ cm³(STP)/cm²·s·cmHg
n-Hexane: $0.7 \times 10^{-6}$ cm³(STP)/cm²·s·cmHg The calculated compositions and flow rates of the streams are shown in Table 25, where stream numbers are as in FIG. 5.

TABLE 25

| Stream | 55 | 59 | 60 | 62 | 63 | 65 | 66 | 68 | 69 |
|---|---|---|---|---|---|---|---|---|---|
| Flow (lb/hr) | 4,017 | 2,361 | 2,671 | 1,745 | 616 | 840 | 1,345 | 441 | 399 |
| Temp. (°C.) | 50 | 43 | 43 | 52 | 52 | −20 | −20 | −15 | −15 |
| Pressure (psia) | 150 | 150 | 20 | 150 | 20 | 150 | 150 | 150 | 20 |

TABLE 25-continued

| Stream | 55 | 59 | 60 | 62 | 63 | 65 | 66 | 68 | 69 |
|---|---|---|---|---|---|---|---|---|---|
| Component (mol %): | | | | | | | | | |
| Methane | 69.0 | 40.0 | 83.1 | 26.4 | 64.9 | 45.6 | 4.2 | 24.7 | 62.9 |
| Ethane | 15.0 | 28.5 | 11.2 | 32.2 | 21.6 | 43.5 | 32.7 | 57.9 | 31.5 |
| Propane | 10.0 | 19.0 | 4.6 | 23.7 | 10.4 | 9.9 | 34.8 | 15.5 | 5.3 |
| N-Butane | 3.0 | 6.2 | 0.7 | 8.6 | 1.8 | 0.8 | 13.6 | 15.4 | 0.2 |
| N-Pentane | 2.0 | 4.2 | 0.3 | 6.0 | 0.9 | 0.1 | 9.7 | 0.3 | 0.02 |
| N-Hexane | 1.0 | 2.2 | 0.1 | 3.2 | 0.3 | 0.02 | 5.1 | 0.03 | 27 ppm |

Membrane area required: First unit: 9.073 m² Second unit: 2,500 m² Third unit: 1,500 m²

Horsepower requirement: 45 hp

As can be seen, an effective separation can be performed, although the membrane area requirements are very high.

Example 34

A calculation was performed to evaluate the performance of the process of the invention in separating a 1,000-scfm gas stream from the purge unit of a polypropylene manufacturing plant. The process configuration was assumed to be as in FIG. 5. The raw gas was assumed to contain a mix of propylene, nitrogen, iso-butane, propane and ethane. The goal was to produce a clean nitrogen stream, suitable for reuse as a resin purge gas, and a liquefied hydrocarbon stream. The feed gas was assumed to be at 15 psia, and to be compressed to 300 psia in compressor 56. The condensation temperature was assumed to be $-20°$ C.

The process was assumed to be carried out using, for all membrane separation steps, a membrane having the following pressure-normalized fluxes, which might be representative of a polyimide membrane, for example:

Nitrogen: $15 \times 10^{-6}$ cm³(STP)/cm²·s·cmHg
Ethane: $3 \times 10^{-6}$ cm³(STP)/cm²·s·cmHg
Propane: $0.5 \times 10^{-6}$ cm³(STP)/cm²·s·cmHg
iso-Butane: $1 \times 10^{-6}$ cm³(STP)/cm²·s·cmHg
Propylene: $2 \times 10^{-6}$ cm³(STP)/cm²·s·cmHg The calculated compositions and flow rates of the streams are shown in Table 26, where stream numbers are as in FIG. 5.

Example 35

A calculation was performed to evaluate the performance of the process of the invention in removing hydrogen from hydrocarbons in a fluid catalytic cracker off-gas having a flow rate of 1,000 scfm and at 500 psia pressure. The process design was assumed to be as in FIG. 1. The hydrogen product gas stream 4 was assumed to be withdrawn from the permeate side of the first membrane separation step at 100 psia. The permeate stream 10 from the second membrane separation step was assumed to be withdrawn from the permeate side of the second membrane separation step at 50 psia and to be recompressed by a compressor in line 10 to 500 psia for return to the feed side of the first membrane unit.

The process was assumed to be carried out using, for both membrane separation steps, a membrane having the following pressure-normalized fluxes, which might be representative of a polyimide membrane, for example:

Hydrogen: $100 \times 10^{-6}$ cm³(STP)/cm²·s·cmHg
Methane: $2 \times 10^{-6}$ cm³(STP)/cm²·s·cmHg
Ethane: $1 \times 10^{-6}$ cm³(STP)/cm²·s·cmHg
Propane: $0.5 \times 10^{-6}$ cm³(STP)/cm²·s·cmHg
n-Butane: $0.2 \times 10^{-6}$ cm³(STP)/cm²·s·cmHg The calculated compositions and flow rates of the streams are shown in Table 27.

TABLE 26

| Stream | 55 | 57 | 59 | 60 | 62 | 63 | 65 | 66 | 68 | 69 |
|---|---|---|---|---|---|---|---|---|---|---|
| Flow (lb/hr) | 5,148 | 8,477 | 4,384 | 4,093 | 2,991 | 1,394 | 2,793 | 1,056 | 858 | 1,935 |
| Temp. (°C.) | 50 | 25 | 30 | 25 | 30 | 30 | −20 | −20 | 10 | 10 |
| Pressure (psia) | 15 | 300 | 265 | 20 | 265 | 20 | 150 | 150 | 150 | 20 |
| Component (mol %): | | | | | | | | | | |
| Ethane | 1.0 | 1.5 | 2.6 | 0.5 | 3.6 | 0.9 | 5.4 | 4.1 | 11.4 | 3.4 |
| Propane | 1.0 | 0.7 | 1.3 | 0.04 | 2.0 | 0.1 | 1.9 | 7.0 | 6.7 | 0.3 |
| I-Butane | 4.0 | 2.6 | 5.1 | 0.3 | 7.5 | 0.6 | 2.4 | 27.1 | 7.7 | 0.6 |
| Propylene | 10.0 | 8.8 | 16.0 | 2.0 | 22.7 | 3.7 | 20.1 | 60.2 | 51.9 | 9.4 |
| Nitrogen | 84.0 | 86.4 | 75.0 | 97.2 | 64.2 | 94.7 | 70.2 | 1.6 | 22.3 | 86.3 |

Membrane area required: First unit: 2,255 m² Second unit: 1,000 m² Third unit: 3,500 m²

Horsepower requirement: 526 hp

TABLE 27

| Stream | 1 | 3 | 4 | 6 | 7 | 9 | 10 |
|---|---|---|---|---|---|---|---|
| Flow (lb/hr) | 2,517 | 2,339 | 282 | 3,584 | 2,232 | 3,480 | 104 |
| Temp. (°C.) | 30 | 37 | 37 | −10 | −10 | −6 | −6 |
| Pressure (psia) | 500 | 500 | 100 | 500 | 500 | 500 | 50 |
| Component (mol %): | | | | | | | |
| Hydrogen | 58.0 | 20.0 | 96.8 | 19.1 | 1.1 | 10.8 | 83.8 |
| Methane | 5.0 | 10.9 | 0.9 | 36.6 | 11.0 | 40.0 | 10.3 |
| Ethane | 25.0 | 46.7 | 1.9 | 39.1 | 58.9 | 43.5 | 5.6 |
| Propane | 10.0 | 18.7 | 0.4 | 4.8 | 24.1 | 5.4 | 0.3 |
| N-Butane | 2.0 | 3.8 | 0.03 | 0.3 | 4.9 | 0.3 | 85 ppm |

Membrane area required: First Stage: 568 m$^2$ Second Stage: 300 m$^2$

Horsepower requirement: 24 hp

Example 36

A calculation was performed to evaluate the performance of the process of the invention in separating a stream containing perfluoroethane and hydrogen, such as might arise from manufacture of perfluorocarbons by electrochemical fluorination. The stream was assumed to contain 0.5% perfluoroethane, 99.5% hydrogen, to be at 15 psia and 25° C., and to have a flow rate of 50 scfm. The process configuration was assumed to be as in FIG. 1, with a compressor in the feed line to compress the feed and the recirculated second-step permeate gas to 215 psia. The condensation temperature was assumed to be −30° C.

The process was assumed to be carried out using, for both membrane separation steps, a membrane having the following pressure-normalized fluxes, which would be typical for a number of glassy membrane materials:

Hydrogen: 200×10$^{-6}$ cm$^3$(STP)/cm$^2$·s·cmHg
Perfluoroethane: 2×10$^{-6}$ cm$^3$(STP)/cm$^2$·s·cmHg The calculated compositions and flow rates of the streams are shown in Tables 28 and 29, where stream numbers are as in FIG. 1.

TABLE 28

| Stream | 1 | 3 | 4 | 6 | 7 | 9 | 10 |
|---|---|---|---|---|---|---|---|
| Flow (lbmol/h) | 8.4 | 0.1 | 8.3 | 1.0 | 0.04 | 0.9 | 0.1 |
| Temp. (°C.) | 25 | 43 | 43 | −30 | −30 | −27 | −27 |
| Pressure (psia) | 15 | 215 | 15 | 215 | 215 | 215 | 15 |
| Component (mol %): | | | | | | | |
| Perfluoroethane | 0.5 | 30.0 | 0.01 | 58.8 | 98.3 | 65.0 | 1.0 |
| Hydrogen | 99.5 | 70.0 | 99.99 | 42.2 | 1.7 | 35.0 | 99.0 |

TABLE 29

| Stream | 1 | 3 | 4 | 6 | 7 | 9 | 10 |
|---|---|---|---|---|---|---|---|
| Flow (lb/h) | 22.5 | 6.0 | 16.9 | 82.0 | 5.6 | 81.7 | 0.3 |
| Component flow (lb/h): | | | | | | | |
| Perfluoroethane | 5.8 | 5.8 | 0.1 | 81.2 | 5.6 | 81.1 | 0.1 |
| Hydrogen | 16.8 | 0.2 | 16.8 | 0.8 | 0.001 | 0.6 | 0.2 |

Membrane area required: First unit: 12 m$^2$ Second unit: 0.4 m$^2$

Horsepower requirement: 14 hp

As can be seen, the separation can be carried out to yield high purity hydrogen and hydrocarbon streams using very modest amounts of membrane area and compressor horsepower.

Example 37

The calculation of Example 36 was repeated, this time assuming a process configuration as in FIG. 2, with a compressor to raise the pressure of the feed and recirculated streams to 215 psia. Other operating parameters were as in Example 36.

The calculated compositions and flow rates of the streams are shown in Tables 30 and 31, where stream numbers are as in FIG. 2.

TABLE 30

| Stream | 11 | 13 | 14 | 16 | 17 | 19 | 20 |
|---|---|---|---|---|---|---|---|
| Flow (lbmol/h) | 8.4 | 0.1 | 8.3 | 0.04 | 0.1 | 0.04 | 0 |
| Temp. (°C.) | 25 | 480 | 480 | 480 | 480 | −30 | — |
| Pressure (psia) | 15 | 215 | 15 | 215 | 15 | 215 | — |
| Component (mol %): | | | | | | | |
| Perfluoroethane | 0.5 | 30.0 | 0.01 | 98.0 | 3.3 | 98.3 | 0 |
| Hydrogen | 99.5 | 70.0 | 99.99 | 2.0 | 96.7 | 1.7 | 0 |

TABLE 31

| Stream | 11 | 13 | 14 | 16 | 17 | 19 | 20 |
|---|---|---|---|---|---|---|---|
| Flow (lb/h) | 22.5 | 6.3 | 16.9 | 5.6 | 0.7 | 5.6 | 0 |
| Component flow (lb/h): | | | | | | | |
| Perfluoroethane | 5.8 | 6.1 | 0.1 | 5.6 | 0.5 | 5.6 | 0 |
| Hydrogen | 16.8 | 0.2 | 16.8 | 0.002 | 0.2 | 0.001 | 0 |

Membrane area required: First Stage: 12 m$^2$ Second Stage: 1 m$^2$

Horsepower requirement: 15 hp

As can be seen, in this arrangement all of the hydrogen remaining after the second membrane separation step dissolved in the perfluorocarbon condensate, so that no off-gas treatment was required. Membrane area and compressor horsepower requirements are again very small.

Example 38

The experimental technique as described for Example 19 was used to measure the selectivity of a silicone rubber composite membrane to a mixture of nitrogen and hexafluoropropene ($C_3F_6$) at different temperatures. In all cases, the feed gas pressure was maintained at 50 psig. The experiments were repeated for feed gas hexafluoropropene volume concentrations of 5%, 20%, 40% and 70% at 22° C., for feed gas hexafluoropropene volume concentrations of 15%, 20% and 30% at −20° C., and for feed gas hexafluoropropene volume concentrations of 5%, 10% and 15% at −39° C. The selectivity of the membranes for hexafluoropropene over nitrogen was calculated.

Figure 15:
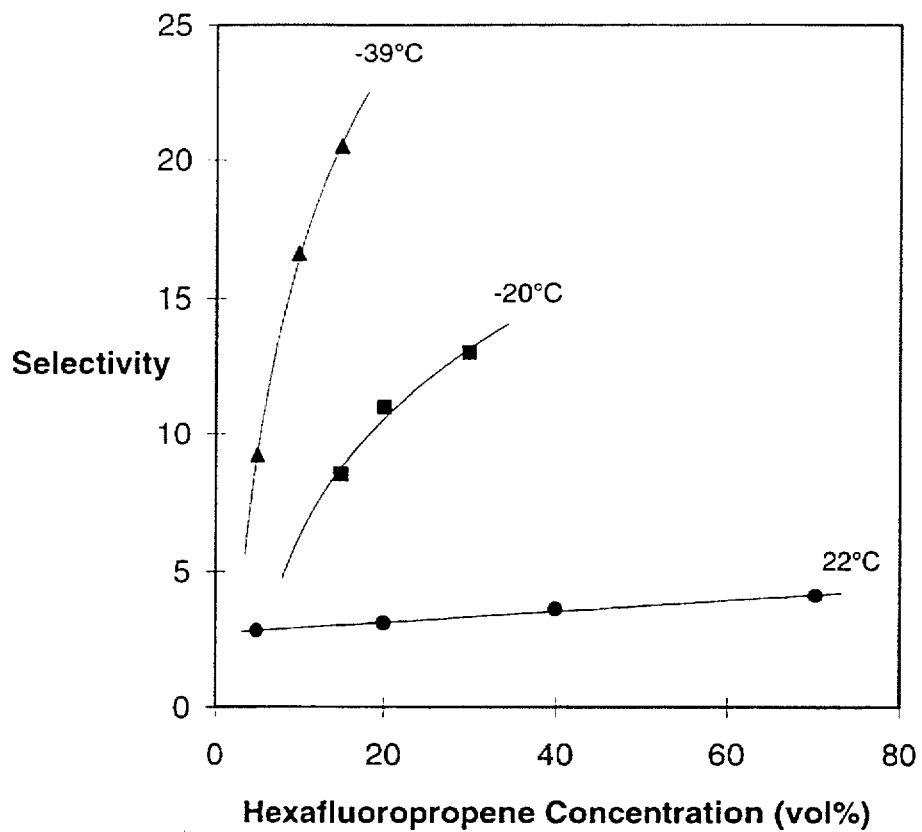
FIG. 15 is a graph showing the mixed gas hexafluoropropene/nitrogen selectivity of a silicone rubber composite membrane as a function of hexafluoropropene concentration at different temperatures.

The results are shown graphically in FIG. 15. As can be seen, the room temperature selectivity of the rubbery membrane for hexafluoropropene is small, varying from about 2 at very low perfluorocarbon concentrations to about 5 at very high concentrations. Operating at −20° C. increases the selectivity for a 20% feed mixture from about 3 to about 12. Operation at −39° C. provides even more dramatic improvement in selectivity.

We claim:

1. A process for separating a perfluoro compound from a second gas in a gas mixture, said process comprising the steps of:
   (a) providing a first membrane having a first feed side and a first permeate side, and being selective for said second gas over said perfluoro compound;
   (b) passing said gas mixture across said first feed side;
   (c) withdrawing from said first feed side a first residue stream depleted in said second gas and enriched in said perfluoro compound compared with said gas mixture;
   (d) withdrawing from said first permeate side a first permeate stream enriched in said second gas and depleted in said perfluoro compound compared with said gas mixture;
   (e) providing a second membrane having a second feed side and a second permeate side, and being selective for said second gas over said perfluoro compound;
   (f) passing said first residue stream across said second feed side;
   (g) withdrawing from said second feed side a second residue stream depleted in said second gas and enriched in said perfluoro compound compared with said first residue stream;
   (h) withdrawing from said second permeate side a second permeate stream enriched in said second gas and depleted in said perfluoro compound compared with said first residue stream;
   (i) passing said second residue stream to a condensation step carried out at a temperature no lower than about −30° C. to liquefy at least a portion of said second residue stream, thereby forming a liquefied perfluoro compound product;
   (j) recirculating said second permeate stream to said first feed side.

2. The process of claim 1, further comprising compressing said gas mixture prior to passing said gas mixture across said first feed side.

3. The process of claim 2, wherein said compressing raises said gas mixture to a pressure no greater than about 500 psia.

4. The process of claim 2, wherein said compressing raises said gas mixture to a pressure no greater than about 200 psia.

5. The process of claim 1, further comprising subjecting an uncondensed gas stream from said condensation step (i) to treatment to separate said second gas from said perfluoro compound.

6. The process of claim 1, further comprising recirculating an uncondensed gas stream from said condensation step (i) to said second feed side.

7. The process of claim 1, further comprising passing an uncondensed gas stream from said condensation step (i) across a third membrane for treatment.

8. The process of claim 1, wherein said condensation step (i) further includes compressing said second residue stream.

9. The process of claim 8, wherein said compressing raises said second residue stream to a pressure no greater than about 500 psia.

10. The process of claim 1, wherein said temperature is no lower than about 0° C.

11. The process of claim 1, wherein said temperature is no lower than about 15° C.

12. The process of claim 1, wherein said first membrane exhibits a transmembrane pressure-normalized flux of said second gas of at least about $1 \times 10^{-5}$ cm$^3$(STP)/cm$^2$·s·cmHg.

13. The process of claim 1, wherein said first membrane comprises a polymer characterized by a fractional free volume of at least about 0.16.

14. The process of claim 1, wherein said first membrane comprises a substituted polyacetylene.

15. The process of claim 1, wherein said first membrane comprises poly(4-methyl-2-pentyne).

16. The process of claim 1, wherein said first membrane comprises a polymer of perfluoro-2,2-dimethyl-1,3-dioxole.

17. The process of claim 1, wherein said first membrane exhibits a selectivity for said second gas over said perfluoro compound of at least about 10 when in use in said process.

18. The process of claim 1, wherein said first membrane exhibits a selectivity for said second gas over said perfluoro compound of at least about 30 when in use in said process.

19. The process of claim 1, wherein said perfluoro compound is a perfluorocarbon.

20. The process of claim 1, wherein said perfluoro compound is selected from the group consisting of perfluoromethane, perfluoroethane, perfluoropropane, methyl fluoride, nitrogen trifluoride and sulfur hexafluoride.

21. The process of claim 1, wherein said perfluoro compound is perfluoroethane.

22. The process of claim 1, wherein said second gas is selected from the group consisting of nitrogen, air, hydrogen, argon and helium.

23. The process of claim 1, wherein said second gas is nitrogen.

24. The process of claim 1, wherein said second gas is hydrogen.

25. The process of claim 1, wherein said second membrane exhibits a transmembrane pressure-normalized flux of said second gas of at least about $1 \times 10^{-5}$ cm$^3$(STP)/cm$^2$·s·cmHg.

26. The process of claim 1, wherein said second membrane comprises a polymer characterized by a fractional free volume of at least about 0.16.

27. The process of claim 1, wherein said second membrane comprises a substituted polyacetylene.

28. The process of claim 1, wherein said second membrane comprises poly(4-methyl-2-pentyne).

29. The process of claim 1, wherein said second membrane comprises a polymer of perfluoro-2,2-dimethyl-1,3-dioxole.

30. The process of claim 1, wherein said second membrane exhibits a selectivity for said second gas over said perfluoro compound of at least about 10 when in use in said process.

31. The process of claim 1, wherein said second membrane exhibits a selectivity for said second gas over said perfluoro compound of at least about 20 when in use in said process.

32. The process of claim 1, further comprising subjecting said gas mixture to additional treatment to separate said second gas from said perfluoro compound prior to passing said gas mixture to said first feed side.

33. The process of claim 32, wherein said second permeate stream is recirculated to an inlet side of said additional treatment.

34. The process of claim 32, wherein said additional treatment comprises additional membrane separation.

35. The process of claim 34, wherein said second permeate stream is recirculated to an inlet side of said additional membrane separation.

36. The process of claim 1, wherein said gas mixture is from a chemical vapor deposition chamber.

37. The process of claim 1, wherein at least about 90% of said perfluoro compound in said gas mixture is recovered in said liquefied perfluoro compound product.

38. The process of claim 1, wherein at least about 95% of said perfluoro compound in said gas mixture is recovered in said liquefied perfluoro compound product.

39. A process for separating a perfluoro compound from a second gas in a gas mixture, said process comprising the steps of:

(a) providing a first membrane having a first feed side and a first permeate side, and being selective for said second gas over said perfluoro compound;

(b) passing said gas mixture across said first feed side;

(c) withdrawing from said first feed side a first residue stream depleted in said second gas and enriched in said perfluoro compound compared with said gas mixture;

(d) withdrawing from said first permeate side a first permeate stream enriched in said second gas and depleted in said perfluoro compound compared with said gas mixture;

(e) passing said first residue stream to a condensation step carried out at a temperature no lower than about $-30°$ C. to liquefy at least a portion of said first residue stream, thereby forming a liquefied perfluoro compound product;

(f) providing a second membrane having a second feed side and a second permeate side;

(g) passing an uncondensed gas stream from said condensation step across said second feed side;

(h) withdrawing from said second feed side a second residue stream depleted in said second gas and enriched in said perfluoro compound compared with said uncondensed gas stream;

(i) withdrawing from said second permeate side a second permeate stream enriched in said second gas and depleted in said perfluoro compound compared with said uncondensed gas stream;

(j) recirculating said second permeate stream to said first feed side;

(k) recirculating said second residue stream to said condensation step.

40. The process of claim 39, further comprising compressing said gas mixture prior to passing said gas mixture across said first feed side.

41. The process of claim 40, wherein said compressing raises said gas mixture to a pressure no greater than about 500 psia.

42. The process of claim 40, wherein said compressing raises said gas mixture to a pressure no greater than about 200 psia.

43. The process of claim 39, wherein said temperature is no lower than about 0° C.

44. The process of claim 39, wherein said temperature is no lower than about 15° C.

45. The process of claim 39, wherein said first membrane exhibits a transmembrane pressure-normalized flux of said second gas of at least about $1 \times 10^{-5}$ cm$^3$(STP)/cm$^2$·s·cmHg.

46. The process of claim 39, wherein said first membrane comprises a polymer characterized by a fractional free volume of at least about 0.16.

47. The process of claim 39, wherein said first membrane comprises a substituted polyacetylene.

48. The process of claim 39, wherein said first membrane comprises poly(4-methyl-2-pentyne).

49. The process of claim 39, wherein said first membrane comprises a polymer of perfluoro-2,2-dimethyl-1,3-dioxole.

50. The process of claim 39, wherein said first membrane exhibits a selectivity for said second gas over said perfluoro compound of at least about 10 when in use in said process.

51. The process of claim 39, wherein said first membrane exhibits a selectivity for said second gas over said perfluoro compound of at least about 30 when in use in said process.

52. The process of claim 39, wherein said perfluoro compound is a perfluorocarbon.

53. The process of claim 39, wherein said perfluoro compound is selected from the group consisting of perfluoromethane, perfluoroethane, perfluoropropane, methyl fluoride, nitrogen trifluoride and sulfur hexafluoride.

54. The process of claim 39, wherein said perfluoro compound is perfluoroethane.

55. The process of claim 39, wherein said second gas is selected from the group consisting of nitrogen, air, hydrogen, argon and helium.

56. The process of claim 39, wherein said second gas is nitrogen.

57. The process of claim 39, wherein said second gas is hydrogen.

58. The process of claim 39, wherein said second membrane exhibits a transmembrane pressure-normalized flux of said second gas of at least about $1 \times 10^{-5}$ cm$^3$(STP)/cm$^2$·s·cmHg.

59. The process of claim 39, wherein said second membrane comprises a polymer characterized by a fractional free volume of at least about 0.16.

60. The process of claim 39, wherein said second membrane comprises a substituted polyacetylene.

61. The process of claim 39, wherein said second membrane comprises poly(4-methyl-2-pentyne).

62. The process of claim 39, wherein said second membrane comprises a polymer of perfluoro-2,2-dimethyl-1,3-dioxole.

63. The process of claim 39, wherein said second membrane exhibits a selectivity for said second gas over said perfluoro compound of at least about 10 when in use in said process.

64. The process of claim 39, wherein said second membrane exhibits a selectivity for said second gas over said perfluoro compound of at least about 20 when in use in said process.

65. The process of claim 39, further comprising subjecting said gas mixture to additional treatment to separate said second gas from said perfluoro compound prior to passing said gas mixture to said first feed side.

66. The process of claim 65, wherein said second permeate stream is recirculated to an inlet side of said additional treatment.

67. The process of claim 65, wherein said additional treatment comprises additional membrane separation.

68. The process of claim 67, wherein said second permeate stream is recirculated to an inlet side of said additional membrane separation.

69. The process of claim 39, wherein said gas mixture is from a chemical vapor deposition chamber.

70. The process of claim 39, wherein at least about 90% of said perfluoro compound in said gas mixture is recovered in said liquefied perfluoro compound product.

71. The process of claim 39, wherein at least about 95% of said perfluoro compound in said gas mixture is recovered in said liquefied perfluoro compound product.

* * * * *